(12) United States Patent
Iwamoto et al.

(10) Patent No.: US 7,641,551 B2
(45) Date of Patent: Jan. 5, 2010

(54) GAME PROGRAM AND GAME APPARATUS USING INPUT TO POINTING DEVICE

(75) Inventors: Daiki Iwamoto, Kyoto (JP); Masahiro Nitta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 330 days.

(21) Appl. No.: 11/350,021

(22) Filed: Feb. 9, 2006

(65) Prior Publication Data

US 2006/0281549 A1 Dec. 14, 2006

(30) Foreign Application Priority Data

May 24, 2005 (JP) .............................. 2005-150354

(51) Int. Cl.
- A63F 9/24 (2006.01)
- A63F 13/00 (2006.01)
- G06F 17/00 (2006.01)
- G06F 19/00 (2006.01)

(52) U.S. Cl. .............................. 463/36; 463/30; 463/31; 463/37; 463/43; 463/44

(58) Field of Classification Search .................. 463/30, 463/31, 36, 37, 43, 44
See application file for complete search history.

(56) References Cited

U.S. PATENT DOCUMENTS

| | | | | |
|---|---|---|---|---|
| 5,634,850 A | * | 6/1997 | Kitahara et al. ............... | 463/33 |
| 6,152,821 A | * | 11/2000 | Nakagawa et al. ............. | 463/4 |
| 6,319,130 B1 | * | 11/2001 | Ooseki et al. .................. | 463/43 |
| 6,542,155 B1 | * | 4/2003 | Mifune et al. ................ | 345/428 |
| 2002/0023265 A1 | * | 2/2002 | Metcalf ........................ | 725/74 |
| 2002/0160823 A1 | * | 10/2002 | Watabe et al. .................. | 463/7 |
| 2005/0159223 A1 | * | 7/2005 | Tahara et al. .................. | 463/43 |

FOREIGN PATENT DOCUMENTS

JP 2002-939 A 1/2002

OTHER PUBLICATIONS

Jouji Komazawa, Action RPG Providing Trip of Twilight World and Beautiful Motion "Revenant", [online] Internet in Aug. 18, 1999, URL:http://www.forest.impress.co.jp/article/1999/08/18/game48.html, 3 pages.

* cited by examiner

*Primary Examiner*—John M Hotaling, II
*Assistant Examiner*—Adetokunbo Torimiro
(74) *Attorney, Agent, or Firm*—Nixon & Vanderhye P.C.

(57) ABSTRACT

A game apparatus stores input positions detected by the input device at predetermined time intervals, in order of detection, into a memory of the game apparatus. Next, a trail vector indicating at least a portion of a trail drawn by the player on the input surface is calculated from the input positions. Further, a reference vector whose starting point is a predetermined position on the input surface and whose ending point is a position determined by the trail vector is calculated. An action of a player's character is determined based on an angle between the trail vector and the reference vector.

20 Claims, 15 Drawing Sheets

GAME PROGRAM AND GAME APPARATUS USING INPUT TO POINTING DEVICE

CROSS REFERENCE OF RELATED APPLICATIONS

The disclosure of Japanese Patent Application No. 2005-150354 is incorporated herein by reference.

BACKGROUND

1. Field of the Technology

The present technology relates to a game program and a game apparatus. More particularly, the present technology relates to a game program and a game apparatus which utilize an input to a pointing device in a game operation.

2. Description of the Background Art

Conventionally, game apparatuses which employ a pointing device, such as a mouse, a touch panel, or the like, as an input device, have been contrived. For example, in some games known in the art, a player causes a player's character to attack an enemy character by pushing an input button of a mouse while pointing the enemy character on a screen with the mouse. In the game, the player moves the player's character using the mouse. During a period of time when an attack against an enemy character is permitted, the player moves the player's character and clicks the left button on the mouse to make an attack. It is also possible for the player to make continuous attacks by continuously hitting the left button.

The above-described attack operation in the game is considerably simple since the left button is only clicked. The player has only one type of attack operation, and an attack pattern performed by the player is uniquely determined with respect to this single type of attack operation, so that the attack operation is monotonous. Therefore, when a player becomes accustomed to performing the operation, the amusement of the attack operation quickly recedes. In other words, in conventional game apparatuses which employ an input of a pointing device, the player's character cannot be caused to perform a variety of actions, so that the game operation is simple. Also, the simple game operation provides the game with a low strategy level and poor amusement.

SUMMARY

Therefore, a feature of an exemplary embodiment presented herein is to provide a game program and a game apparatus which can cause a player's character to perform various actions in a game which utilizes an input of a pointing device.

The exemplary embodiment has the following to attain the feature mentioned above. Note that, in this section, reference numerals, supplemental descriptions, and the like in parentheses indicate correspondence with embodiments described below so as to assist understanding of the exemplary embodiment, and do not limit the exemplary embodiment.

A first aspect of an exemplary embodiment presented herein is directed to a recording medium storing a game program which is executed by a computer of a game apparatus comprising an input device (touch panel 15) of detecting a position specified by a player on an input surface. The game program causes the computer to execute a storing step (S5 or S11), a trail vector calculating step (S43 or S72), a reference vector calculating step (S62), and an action determining step (S64). In the storing step, the computer stores input positions detected by the input device at predetermined time intervals, in order of detection, into a memory (RAM 24) of the game apparatus. In the trail vector calculating step, the computer calculates a trail vector (v1) indicating at least a portion of a trail drawn by the player on the input surface, from the input positions. In the reference vector calculating step, the computer calculates a reference vector whose staffing point is a predetermined position on the input surface and whose ending point is a position determined by the trail vector (including a starting point, a middle point, and an ending point of the trail vector). In the action determining step, the computer determines an action of a player's character (41) based on an angle (θ1 in FIG. 4) between the trail vector and the reference vector. In the display control step, the computer causes a display device (second LCD) to display a state of the player's character performing the determined action.

In a second aspect of an exemplary embodiment presented herein, the input surface may be provided on a screen of the display device, and the input device may be a device of detecting a position specified by the player on the screen. In this case, the player's character is displayed on the screen. The predetermined position is a position at which the player's character is displayed.

In a third aspect of an exemplary embodiment presented herein, in the display control step, the state of the player's character performing the determined action may be displayed so that the action is directed from the position at which the player's character is displayed toward a staffing point, a middle point, or an ending point of the trail vector.

In a fourth aspect of an exemplary embodiment presented herein, the predetermined position may be a center position of the screen.

In a fifth aspect of an exemplary embodiment presented herein, the game program may further cause the computer to execute a movement determining step (S52 and S53). In the movement determining step, the computer determines a movement direction of the player's character based on the input positions detected by the input device. In this case, the display control step includes a step (S54) of causing the display device to display a state of the player's character moving in the movement direction determined by the movement determining step.

In a sixth aspect of an exemplary embodiment presented herein, the movement determining step may be performed every time an input position is detected by the input device under a condition that the action determined by the action determining step is not being performed by the player's character.

In a seventh aspect of an exemplary embodiment presented herein, in the action determining step, the action of the player's character may be determined only when a magnitude of the trail vector is larger than or equal to a predetermined value (see step S73 in FIG. 19).

In an eighth aspect of an exemplary embodiment presented herein, in the action determining step, the action of the player's character is determined only when the portion of the trail indicated by the trail vector is input within a predetermined time (see step S32 in FIG. 16 and step S71 in FIG. 19).

In a ninth aspect of an exemplary embodiment presented herein, the trail vector calculating step may include a step (S31 and S32) of approximating the trail drawn by the player on the input surface as one or more straight lines, and calculating a vector indicating each straight line as the trail vector. In this case, in the action determining step, an action of the player's character is determined for each trail vector separately. In the display control step, a state of the player's character continuously performing the determined actions is displayed on the display device.

In a tenth aspect of an exemplary embodiment presented herein, in the action determining step, when a plurality of trail vectors are calculated in the trail vector calculating step, an action different from when a single trail vector is calculated may be determined.

In an eleventh aspect of an exemplary embodiment presented herein, in the trail vector calculating step, a vector whose staffing point is a first detected one (point P2 in FIG. 5) of the input positions continuously detected by input device and whose ending point is a finally detected one thereof (point P3 in FIG. 5) may be calculated as the trail vector.

In a twelfth aspect of an exemplary embodiment presented herein, the trail vector calculating step may include the following two steps. Specifically, in the first step (S31 and S32), the computer selects an input position corresponding to a vertex having an angle between two line segments connected together which is smaller than or equal to a predetermined value, from a broken line connecting the input positions continuously detected by the input device. In a second step (S33), the computer calculates a vector connecting two successively detected input positions in order of detection, as a trail vector, when the number of the selected input positions is two or more.

In a thirteenth aspect of an exemplary embodiment presented herein, in the reference vector calculating step, the reference vector having the ending point of the trail vector as the ending point of the reference vector may be calculated.

A function achieved by executing the above-described game program may be provided in the form of a game apparatus having the same function as that function. The exemplary embodiment may also be provided as a method of controlling an action of a player's character, the method being performed by the game apparatus.

According to the first aspect, the player can select and use a plurality of types of actions by changing a trail drawn on the screen. In other words, even in a game using a pointing device, it is possible to readily cause a player's character to perform various actions. For example, if the first aspect is applied to an attack action, an attack pattern of the player's character can be changed, depending on a relationship between a direction from a predetermined position to an input trail and a direction in which the input trail is drawn. Thereby, various attacks against an enemy character can be provided as is different from a monotonous attack in conventional techniques, thereby making it possible to improve the strategy level and amusement of the game.

According to the second aspect, an action of the player's character can be changed, depending on a relationship between the player's character displayed on the screen and the input trail. Since the position of the player's character on the screen varies, the action of the player's character screen varies, depending on the position of the player's character, even if the same input trail is drawn at the same position. Therefore, the player draws an input trail for causing the player's character to perform a desired action, taking the position of the player's character into consideration, thereby making it possible to provide a sense of game operation which is not conventionally obtained.

According to the third aspect, the player's character performs an action in a direction in which a trail is drawn. Therefore, the player can specify a direction of an action by drawing a trail. Therefore, an operation of specifying a direction in which an action is performed and an operation of drawing a trail do not need to be separately performed, whereby a player's operation can be simplified and the operability of a game can be improved.

According to the fourth aspect, the player can input a trail in any of upward, downward, leftward, and rightward directions from the player's character displayed on a center of the screen. Therefore, the player can readily perform an operation of causing the player's character to perform an action in any direction.

According to the fifth aspect, an operation of moving the player's character and an operation of causing the player's character to perform an action can be performed using a single input device, thereby making it possible to the operability of a game.

According to the sixth aspect, the player's character is not moved while a predetermined action is being performed. Therefore, it is possible to prevent an unnatural behavior that the player's character moves during an action.

According to the seventh aspect, it is possible to distinguish an operation of performing an action from a moving operation. Specifically, when the magnitude of a trail vector is smaller than a predetermined value, the player's character is only moved. When the player wishes to perform a moving operation, the player only needs to draw a trail whose trail vector has a magnitude smaller than the predetermined value. Thereby, it is possible to prevent an action which is not intended by the player. Therefore, the operability can be improved when the above-described two operations are performed. In addition, the player can select and use two operations by using a single type of operation method, i.e., an input operation with respect to the input surface.

According to the eighth aspect, an operation of performing an action can be distinguished from a moving operation. Specifically, when the player wishes to perform a moving operation, an operation of drawing a trail is performed for a predetermined time or longer, thereby preventing an action which is not intended by the player. Thereby, the operability can be improved when the above-described two operations are performed. In addition, the player can select and use two operations by using a single type of operation method, i.e., an input operation with respect to the input surface.

According to the ninth aspect, a trail drawn by the player is approximated as one or more straight lines, thereby making it possible to calculate a trail vector even when the player draws a trail having a complicated shape. In addition, by a single operation of drawing a trail, it is possible to cause the player's character to continuously perform a plurality of actions.

According to the tenth aspect, the variety of actions performed by the player's character can be further increased, thereby making it possible to further improve the strategy level and amusement of a game.

According to the eleventh aspect, it is possible to readily calculate a trail vector from a trail drawn by the player.

According to the twelfth aspect, even when a trail contains a plurality of straight line portions, it is possible to calculate each straight line approximating a corresponding portion of the trail. In addition, it is possible to readily calculate a plurality of trail vectors from a single trail.

According to the thirteenth aspect, it is possible to readily determine the position of the ending point of a reference vector based on a trail vector.

These and other features, aspects and advantages of the exemplary embodiment presented herein will become more apparent from the following detailed description when taken in conjunction with the accompanying drawings.

DESCRIPTION OF THE PREFERRED EMBODIMENTS

Figure 1:
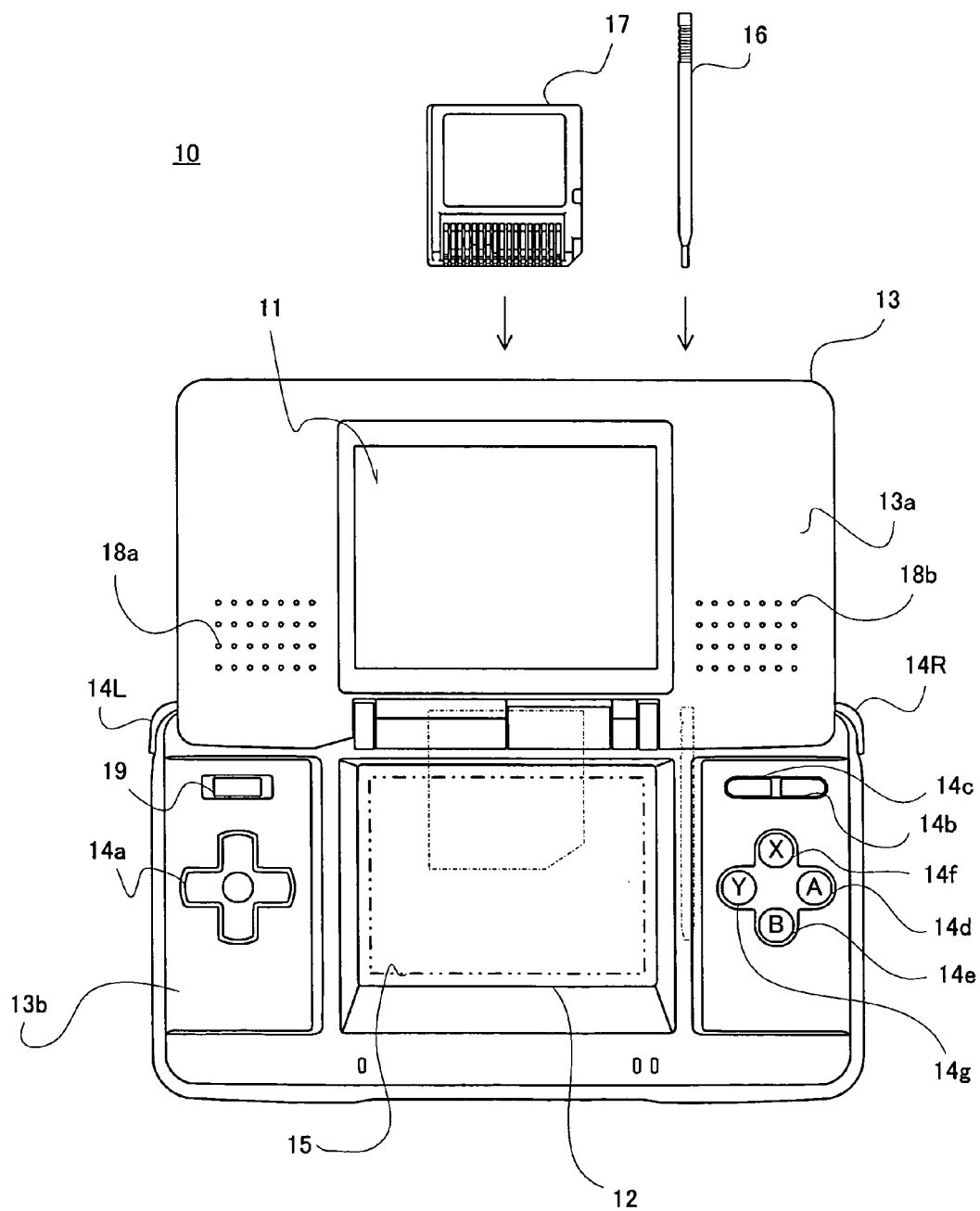
FIG. 1 is a diagram illustrating an external appearance of a game apparatus according to an embodiment.

Hereinafter, a game program and a game apparatus according to an embodiment will be described. Firstly, a structure of a hand-held game apparatus which is an exemplary game apparatus for executing a game program will be described. FIG. 1 is a diagram illustrating an external appearance of the game apparatus. In FIG. 1, the game apparatus 10 includes a first LCD (Liquid Crystal Display device) 11 and a second LCD 12. A housing 13 is composed of an upper housing 13a, and a lower housing 13b. The first LCD 11 is housed in the upper housing 13a, while the second LCD 12 is housed in the lower housing 13b. The first LCD 11 and the second LCD 12 each have a resolution of 256 dots×192 dots. Although an LCD is used as a display device in this embodiment, any other display devices, such as a display device employing EL (Electro Luminescence) and the like, can be used. Also, the display device can have any resolution.

Sound holes 18a and 18b through which sound is emitted from a pair of loudspeakers (30 in FIG. 2) described below to the outside are formed on the upper housing 13a.

On the lower housing 13b, a cross switch 14a, a start switch 14b, a select switch 14c, an A-button 14d, a B-button 14e, an X-button 14f, a Y-button 14g, an L-button 14L, and an R-button 14R are provided as input devices. As an additional input device, a touch panel 15 (indicated with a dash-dot-dot line in FIG. 1) is attached onto a screen of the second LCD 12. In addition, the lower housing 13b is provided with a power switch 19, and slots (indicated with a dash-dot line) into which a memory card 17 and a stick 16 are inserted.

The touch panel 15 may be of any type including, for example, a resistance film type, an optical (infrared) type, and an electrostatic capacitance coupling type, and the like. The touch panel 15 has a function of outputting coordinate data corresponding to a touch position when the stick 16 touches a surface of the touch panel 15. Although it is hereinafter assumed that a player operates the touch panel 15 using the stick 16, a pen (stylus pen) or a finger can be used instead of the stick 16 so as to operate the touch panel 15. In this embodiment, the touch panel 15 has the same resolution (detection precision) as that of the second LCD 12, i.e., 256 dots×192 dots. Note that the touch panel 15 and the second LCD 12 do not have to have the same resolution.

The memory card 17 is a recording medium which stores a game program, and is detachably inserted into the slot provided in the lower housing 13b.

Figure 2:
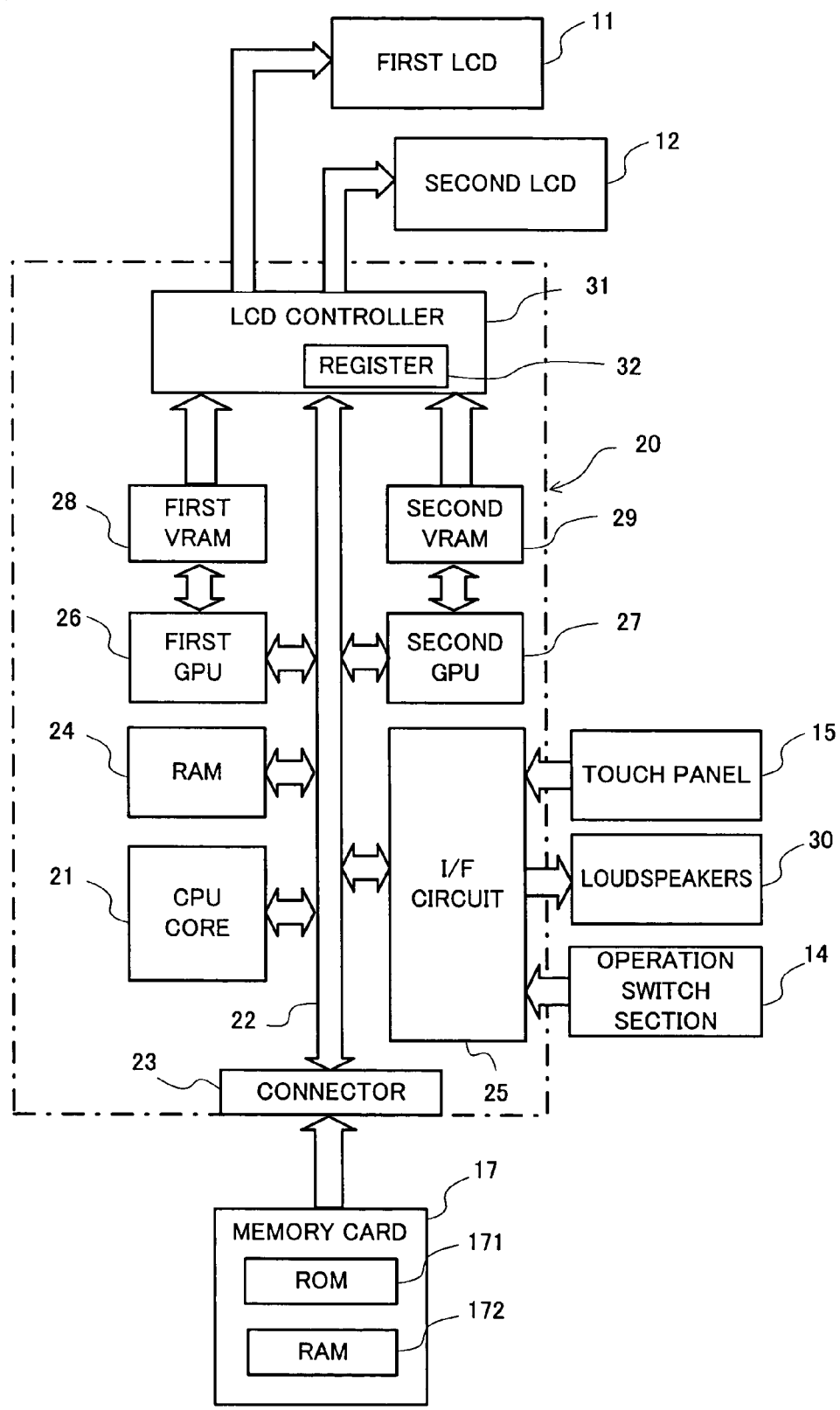
FIG. 2 is a diagram illustrating an internal structure of the game apparatus of FIG. 1.

Next, an internal structure of the game apparatus 10 will be described with reference to FIG. 2. In FIG. 2, a CPU core 21 is provided on an electronic circuit board 20 which is housed in the housing 13. A connector 23, an input/output interface circuit (denoted as I/F circuit in FIG. 2) 25, a first GPU (Graphics Processing Unit) 26, a second GPU 27, a RAM 24, and an LCD controller 31 are connected via a bus 22 to the CPU core 21. The memory card 17 is detachably connected to the connector 23. The memory card 17 comprises a ROM 171 which stores a game program and a RAM 172 which stores rewritable backup data. The game program stored in the ROM 171 of the memory card 17 is loaded into the RAM 24, and the game program loaded in the RAM 24 is executed by the CPU core 21. In addition to the game program, the RAM 24 stores temporary data obtained by the CPU core 21 executing the game program, and data for generating a game image. The touch panel 15, the loudspeaker 30, and an operation switch section 14 composed of the cross switch 14a, the A-button 14d, and the like of FIG. 1, are connected to the I/F circuit 25. The loudspeaker 30 is provided inside under the sound holes 18a and 18b.

A first VRAM (Video RAM) 28 is connected to the first GPU 26, and a second VRAM 29 is connected to the second GPU 27. The first GPU 26 generates a first game image based on data for generating a game image, the data being stored in the RAM 24, and draws the first game image into the first VRAM 28, in accordance with a command from the CPU core 21. Similarly, the second GPU 27 generates a second game image and draws the second game image into the second VRAM 29 in accordance with a command from the CPU core 21. The first VRAM 28 and the second VRAM 29 are connected to the LCD controller 31.

The LCD controller 31 includes a register 32. The register 32 stores a value of 0 or 1 in accordance with a command from the CPU core 21. When the value of the register 32 is 0, the LCD controller 31 outputs the first game image drawn in the first VRAM 28 to the first LCD 11, and outputs the second game image drawn in the second VRAM 29 to the second LCD 12. When the value of the register 32 is 1, the LCD controller 31 outputs the first game image drawn in the first VRAM 28 to the second LCD 12, and outputs the second game image drawn in the second VRAM 29 to the first LCD 11.

Note that the above-described structure of the game apparatus 10 is provided only for illustrative purposes, and the exemplary embodiment can also be applied to any computer system which has at least one display device. Further, the game program of the exemplary embodiment is not only supplied to a computer system via an external storage medium, such as the memory card 17 or the like, but also may be supplied to the computer system via a wired or wireless communication line. Alternatively, the game program of the exemplary embodiment may be previously stored in a non-volatile storage device in the computer system.

Hereinafter, an outline of a game performed by executing a game program in the game apparatus 10 will be described. In this game, a player's character which is operated by a player, and an enemy character appear in a three-dimensional virtual game space. The player operates the player's character to attack the enemy character in order to kill the enemy character for a purpose of the game. Hereinafter, details of the game will be described with reference to FIGS. 3 to 12.

Figure 3:
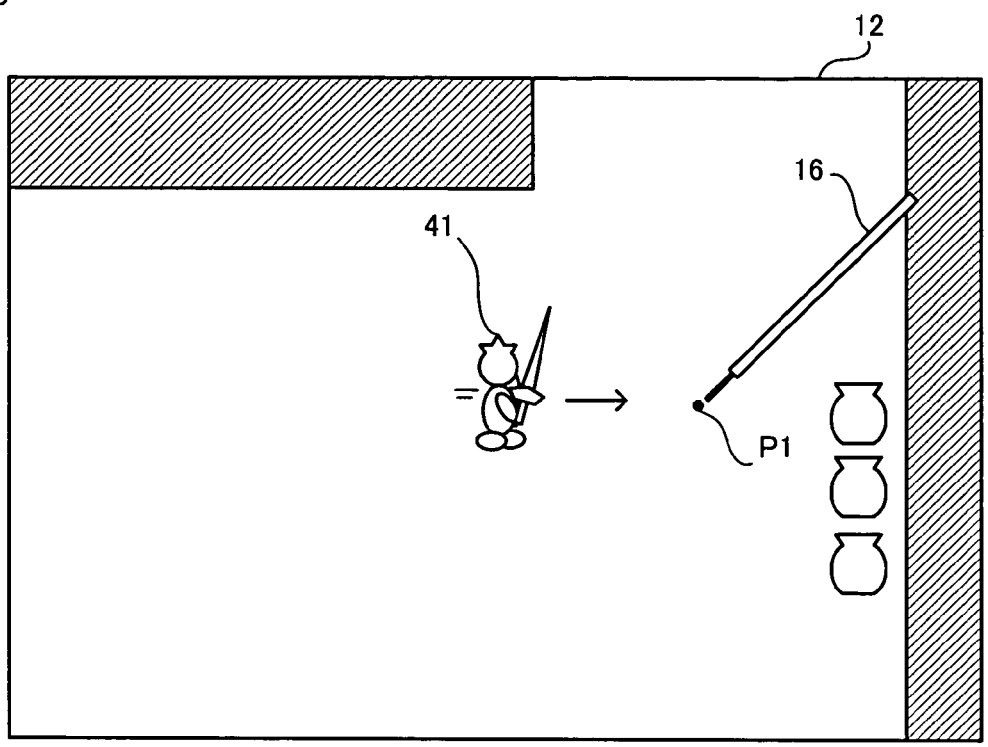
FIG. 3 is a diagram illustrating an exemplary game screen displayed on a second LCD 12 of the game apparatus 10.

FIG. 3 is a diagram illustrating an exemplary game screen displayed on the second LCD 12 of the game apparatus 10. As illustrated in FIG. 3, in this embodiment, an image obtained by viewing a game space including a player's character 41 from a virtual camera is displayed on the second LCD 12. In this embodiment, parameters, such as a position of the virtual camera, a direction of line of sight, and the like, are set so that the player's character 41 is displayed at a center of the screen. In other embodiments, the player's character 41 may not be always displayed at the center of the screen. Note that the first LCD 11 may not be used, or may display information, such as various parameters indicating physical strength or ability of the player's character, items possessed by the player's character, and the like.

The player can perform an operation for moving the player's character 41 (moving operation) by an input to the touch panel 15 (touch input). When detecting a position at which the player performs an input (input position), the game apparatus 10 determines a movement direction of the player's character 41 based on the detected input position. Thereafter, the player's character 41 is moved in the movement direction. The player's character 41 moves toward the input position with a predetermined speed. For example, as illustrated in FIG. 3, when the player points the position of a point P1 using the stick 16, the player's character 41 moves toward the point P1 with the predetermined speed (see the arrow indicated in FIG. 3).

The player can also perform an operation of causing the player's character 41 to make an attack (attack operation) by an input to the touch panel 15. In other words, according to this embodiment, the player can perform each operation (the moving operation and the attack operation) with respect to the player's character 41 using the touch panel 15. Further, the player can perform a plurality of types of attack operations, depending on a trail which the player draws on the screen of the second LCD 12 (an input surface of the touch panel 15). Specifically, the player can cause the player's character to make four types of normal attacks (thrust, right slanting cut, left slanting cut, and vertical cut) by drawing a linear trail on the screen. Also, the player can cause the player's character to perform continuous attacks by performing an operation of continuously drawing linear trails (scratch operation). Hereinafter, details of the attack operation will be described.

Figure 4:
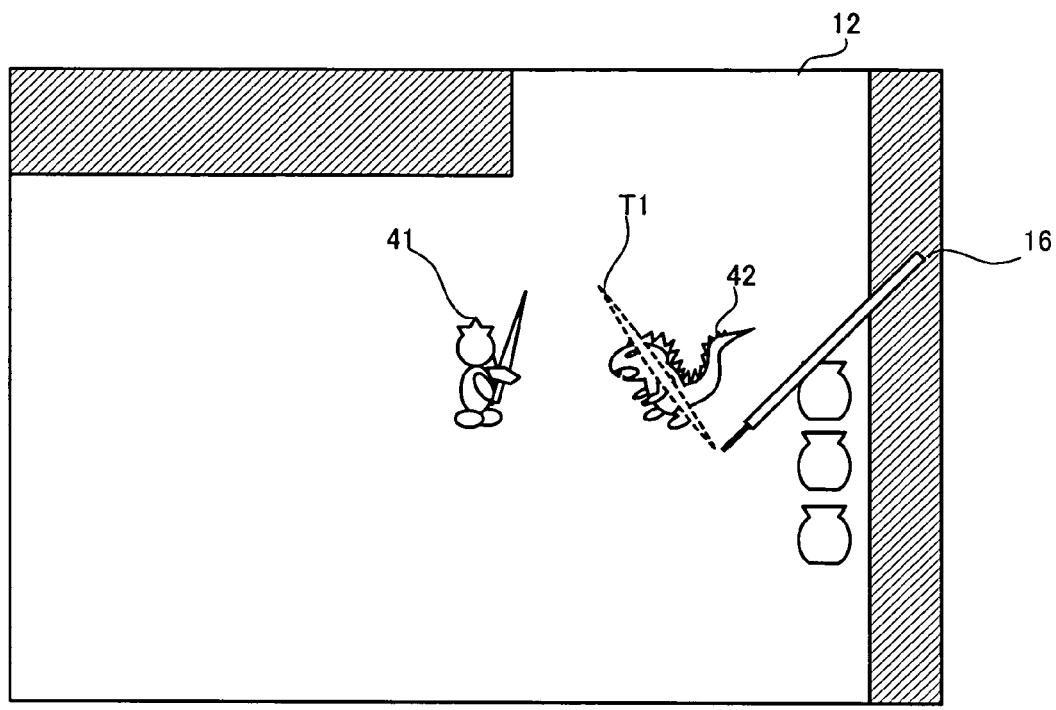
FIG. 4 is a diagram illustrating a game screen when a player performs an attack operation for normal attacks.

Firstly, a process when the player's character performs the normal attacks will be described with reference to FIGS. 4 to 10. FIG. 4 is a diagram illustrating a game screen when the player performs an attack operation for the normal attacks. In FIG. 4, an image of a game space in which the player's character 41 and an enemy character 42 appear is displayed on the second LCD. Also in FIG. 4, it is assumed that a trail T1 is drawn by the player in a region on a right side of the player's character 41. Note that an image indicating the trail drawn by the player may or may not be displayed.

Figure 5:
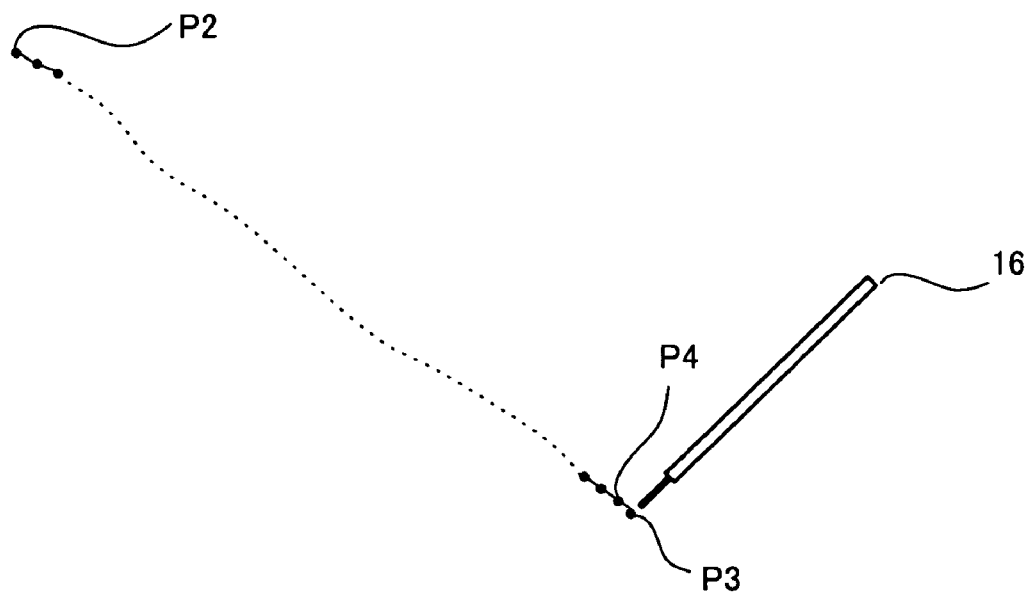
FIG. 5 is a diagram illustrating a trail T1 of FIG. 4.

FIG. 5 is a diagram illustrating the trail T1 of FIG. 4. As illustrated in FIG. 5, the trail drawn by the player is represented by a set of input positions (closed circles illustrated in FIG. 5) which are successively detected by the touch panel 15. Hereinafter, one of the successively detected input positions which is first detected (a point P2 illustrated in FIG. 5) is referred to as an initial input position. During a period of time when the input positions are successively detected by the touch panel 15, a latest input position (an input position detected last; a point P3 illustrated in FIG. 5) is referred to as a current input position. An input position which is detected immediately before the current input position (a point P4 illustrated in FIG. 5) is referred to as a previous input position.

Figure 6:
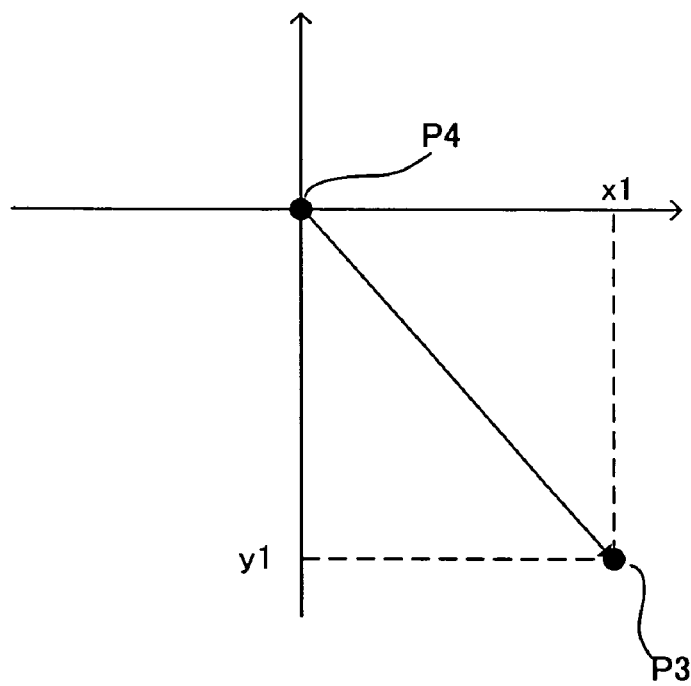
FIG. 6 is a diagram illustrating a current input position and a previous input position of FIG. 5.

Note that, in this embodiment, a position detected by the touch panel 15 is represented by a coordinate system in which the lower left corner of the screen is the origin, the upward direction of the screen is the positive direction of the y axis, and the right direction of the screen is the positive direction of the x axis. The touch panel 15 outputs coordinate data which is represented with the coordinate system. Here, a vector which connects two successively detected input positions in order of detection (earlier first) is referred to as a differential vector. Particularly, a vector whose starting point is a previous input position and whose ending point is a current input position is referred to as a current differential vector. FIG. 6 is a diagram illustrating the current input position and the previous input position of FIG. 5. In the example of FIG. 6, the current differential vector is represented by (x1, y1). A vector immediately before a current differential vector is referred to as a previous differential vector. A previous differential vector is a vector whose starting point is an input position which is detected immediately before a previous input position and whose ending point is the previous input position.

Figure 7:
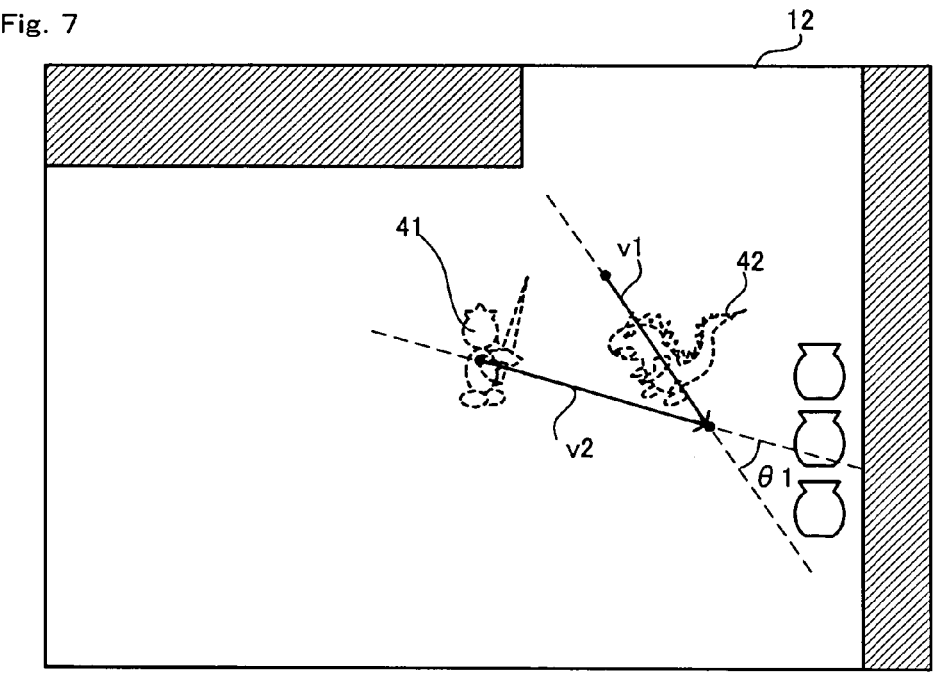
FIG. 7 is a diagram illustrating a trail vector and a reference vector.

Referring back to FIG. 4, when the player draws a trail, the game apparatus 10 calculates a trail vector and a reference vector. FIG. 7 is a diagram illustrating the trail vector and the reference vector. Note that FIG. 7 illustrates the player's character 41 and the enemy character 42 with a dashed line for the sake of clarity of a trail vector v1 and a reference vector v2. The trail vector v1 and the reference vector v2 of FIG. 7 are not actually displayed on the screen.

The trail vector refers to a vector indicating a trail drawn by the player. Here, the trail vector is calculated by approximating the trail as a straight line. Specifically, the trail vector is a vector whose starting point is the initial input position of the trail and whose ending point is a finally detected input position.

Note that the trail vector is not necessarily a vector indicating a whole trail, and may be a vector indicating at least a portion of a continuously input trail, and details thereof will be described below. For example, when a trail is drawn by the above-described scratch operation, a vector indicating a straight line portion which is a part of the trail is calculated as a trail vector.

On the other hand, the reference vector v2 is a vector whose starting point is the position of the player's character 41 on the screen and whose ending point is a position determined by the trail vector v1. Here, the term "position determined by a trail vector" refers to a position which is uniquely determined when the trail vector is determined, such as, for example, a starting point, a middle point, and an ending point of the trail vector. As illustrated in FIG. 7, in this embodiment, the position determined by the trail vector v1 is the position of the ending point of the trail vector v1.

Figure 8:
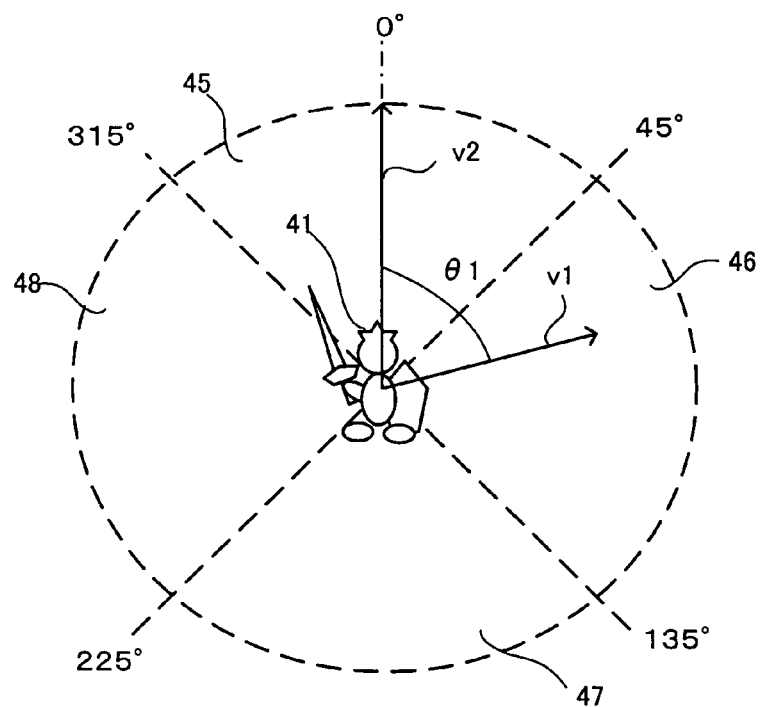
FIG. 8 is a diagram for explaining a method of determining an attack action of a player's character.

After calculation of the trail vector v1 and the reference vector v2, the game apparatus 10 calculates an angle θ1 between the trail vector v1 and the reference vector v2. Thereafter, the game apparatus 10 determines an attack action of the player's character based on the calculated angle θ1. FIG. 8 is a diagram for explaining a method of determining the attack action of the player's character. In FIG. 8, the starting points of the trail vector v1 and the reference vector v2 are placed at the same position. In this embodiment, the angle θ1 between the trail vector v1 and the reference vector v2 is assumed to be represented as an angle which is measured clockwise from the reference vector v2 (reference direction: 0°) to the trail vector v1. The range of θ1 is $020° \leqq \theta1 < 360°$. The range of θ1 is divided into four, i.e., first to four ranges 45 to 48, depending on the attack action. Specifically, these ranges are set as follows.

First range (region 45 in FIG. 8): $0 \leqq \theta1 \leqq 45°$ or $315° < \theta1 < 360°$
Second range (region 46 in FIG. 8): $45° < \theta1 \leqq 135°$
Third range (region 47 in FIG. 8): $135° < \theta1 \leqq 225°$
Fourth range (region 48 in FIG. 8): $225° < \theta1 \leqq 315°$ It is assumed that the direction of the reference vector v2 is a front direction when viewed from the player's character 41. The first range is a range of θ1 when the trail vector v1 is oriented in substantially the front direction. The second range is a range of θ1 when the trail vector v1 is oriented in a right direction. The third range is a range of θ1 when the trail vector v1 is oriented in a left direction. The fourth range is a range of θ1 when the trail vector v1 is oriented in a back direction.

These ranges are associated with respective attack actions. Specifically, the first range is associated with a "thrust" action. The second range is associated with a "left slanting cut". The third range is associated with a "vertical cut". The fourth range is associated with a "right slanting cut".

The game apparatus 10 determines to which range the value of the calculated θ1 belongs. Thereafter, the game apparatus 10 determines an action corresponding to a range to which the value of the calculated θ1 belongs, as an attack action to be performed by the player's character. For example, in the case of FIG. 8, since θ1 belongs to the second range, the attack action to be performed by the player's character is determined to be the "left slanting cut" corresponding to the second range.

Figure 9:
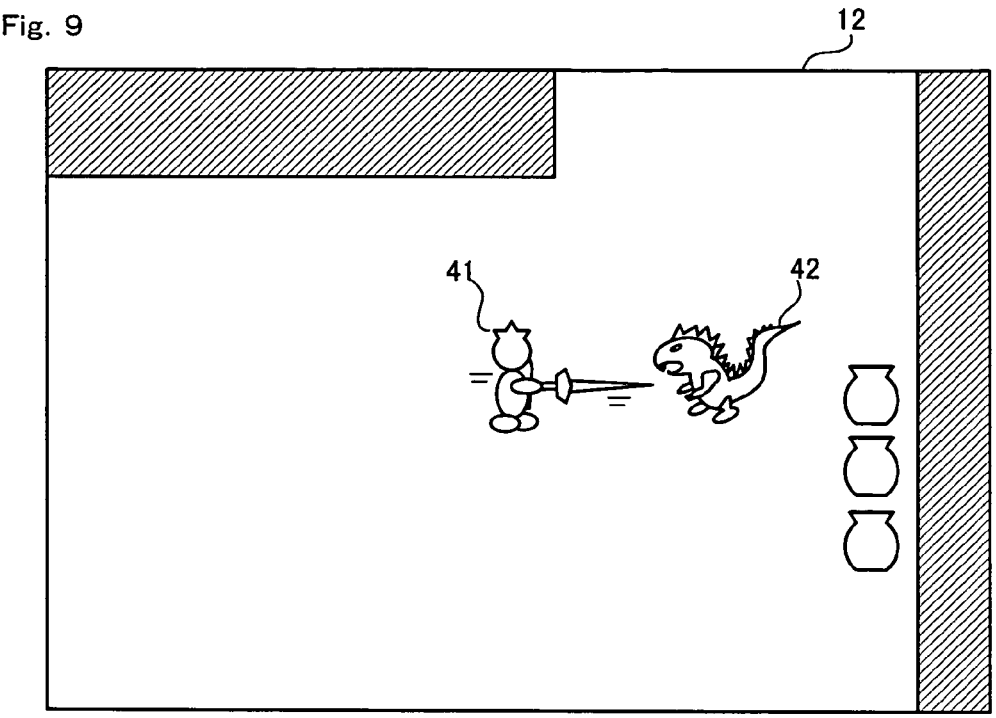
FIG. 9 is a diagram illustrating a game screen when the player's character performs a "thrust" attack action.
Figure 10:
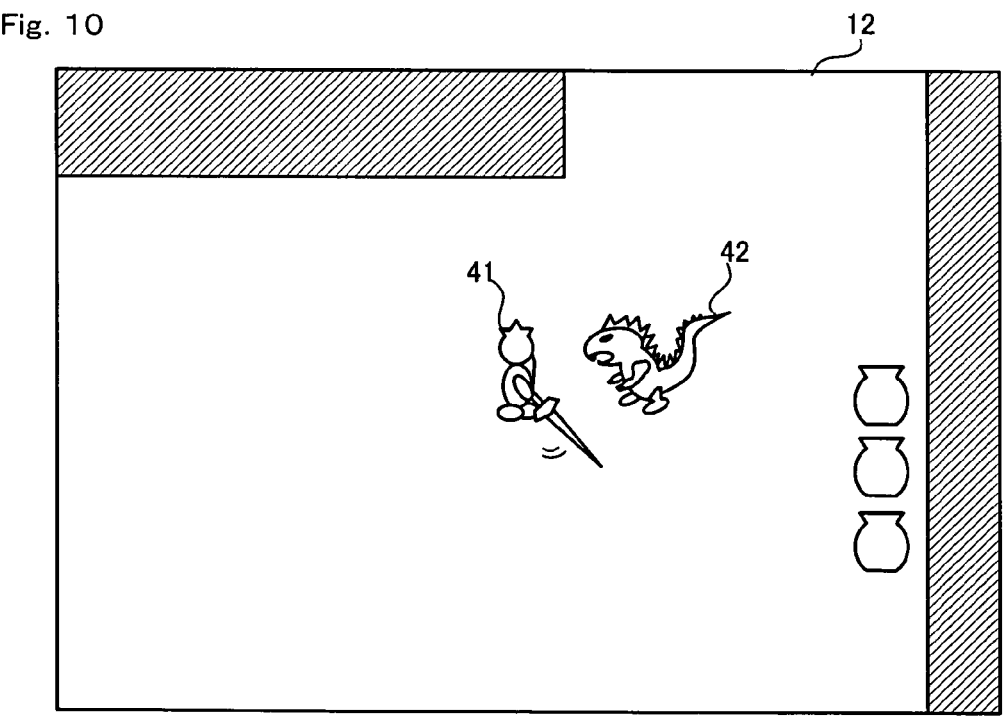
FIG. 10 is a diagram illustrating a game screen when the player's character performs a "right slanting cut" attack action.

After determination of the attack action of the player's character, the game apparatus 10 displays, on the second LCD, an image of the determined action performed by the player's character. FIGS. 9 and 10 are diagrams illustrating a game screen when the player's character performs an attack action. For example, when the angle θ1 belongs to the first range, the player's character 41 performs the "thrust" action as illustrated in FIG. 9. When the angle θ1 belongs to the fourth range, the player's character 41 performs the "right slanting cut" action as illustrated in FIG. 10. Thus, in this embodiment, the action performed by the player's character varies depending on the correspondence between a direction of a trail drawn by the player (trail vector) and a direction from the player's character to the trail (reference vector).

Note that a direction in which the player's character 41 performs an attack action is determined based on the trail vector. Specifically, the game apparatus 10 controls a behavior of the player's character 41 so that the player's character 41 performs the action toward the middle point of the trail vector. Note that, in other embodiments, the player's character 41 may perform the action from the current position toward the starting point of the trail vector or toward the ending point of the trail vector. Note that, when an action is performed toward the middle point or the ending point of the trail vector in a manner which draws a trail as if it cut the enemy character (see FIG. 4), an attack can be made against the enemy character. In this case, the player performs a game operation as if the player actually attacked the enemy character using the stick 16, thereby making it possible to improve the operability of the game. Also in this embodiment, since the player's character 41 is displayed at a center of the screen, the player can readily draw a trail in any of the upward, downward, leftward, and rightward directions from the player's character 41 as a reference. In other words, the player can cause the player's character 41 to make an attack in all directions.

The game apparatus 10 determines whether or not the attack action performed by the player's character 41 hit the enemy character 42. When it is determined that the attack action hit the enemy character 42, the enemy character 42 is damaged. In this embodiment, the damage which the enemy character 42 suffers varies depending on each action. A time required for the player's character 41 to make an attack (a time from the start of an attack action until the attack hits the enemy character) varies depending on each action. For example, the "thrust" action may cause small damage though the time required for the attack is short (quick attack), and the "vertical cut" action may cause large damage though the time required for the attack is long (delayed attack). Thus, by setting a game effect varying depending on each action, the strategy level of the game can be improved.

Also in this embodiment, during a period of time when the player's character 41 is performing an attack action, an operation of moving the player's character 41 is not performed. Therefore, even if the player performs a moving operation while the player's character 41 is performing an attack action, the moving operation is ignored.

As described above, in this embodiment, the player's character can perform the four types of normal attacks, and the player can select and use the four types of attack actions by drawing corresponding different trails on the screen. Thereby, it is possible to readily cause the player's character to perform various actions even in a game which employs a pointing device, such as the touch panel 15 or the like.

Also in this embodiment, when a trail is drawn by the player from a closer point to a farther point as viewed from the player's character 41, the trail vector v1 belongs to the first range. Therefore, in this case, the player's character 41 performs the "thrust" action (see FIG. 9). When a trail is drawn from the left to the right as viewed from the player's character 41, the trail vector v1 belongs to the second range. Therefore, in this case, the player's character 41 performs the "left slanting cut" action. Similarly, when a trail is drawn from a farther point to a closer point as viewed from the player's character 41, the player's character 41 performs the "vertical cut" action. When a trail is drawn from the right to the left as viewed from the player's character 41, the player's character 41 performs the "right slanting cut" action (see FIG. 10). Thus, in this embodiment, the trail of a sword swung by the player's character 41 resembles the trail drawn by the player. For example, when the player wishes to attack the enemy character 42 by the "thrust" action, the player only needs to draw a trail from a closer point to a father point as viewed from the player's character 41 as if the player actually thrust the enemy character 42 using the stick 16. In this case, the player's character 41 performs an action which resembles a trail image drawn by the player. Therefore, the player readily images a method of performing an attack operation, i.e., it is possible to provide an operation method which is easily understood by the player.

As described above, in this embodiment, by drawing a trail on the screen, the player can cause the player's character to make the normal attacks. Note that, in this embodiment, it is necessary to satisfy a condition such that the trail drawn by the player has a predetermined length or more and is input within a predetermined time. In other words, if the trail drawn by the player does not satisfy the condition, the game apparatus 10 does not cause the player's character to make the normal attacks. Note that, in this case, the operation of the player drawing the trail is regarded as a moving operation, and the game apparatus 10 performs a process of moving the player's character in a direction corresponding to the input position. Therefore, the player needs to draw a linear trail having the predetermined length or more with a predetermined speed in order to perform an attack operation.

The above-described condition is set in order to distinguish a moving operation from an attack operation, concerning an operation performed by the player. In this embodiment, both the moving operation and the attack operation are performed on the touch panel 15. Therefore, unless the above-described condition is set, an operation of drawing a trail which is performed by the player in order to perform a moving operation may be regarded as an attack operation, so that the attack action is performed. Therefore, in this embodiment, the above-described condition is set in order to prevent performance of an attack action which is not intended by the player.

Figure 11:
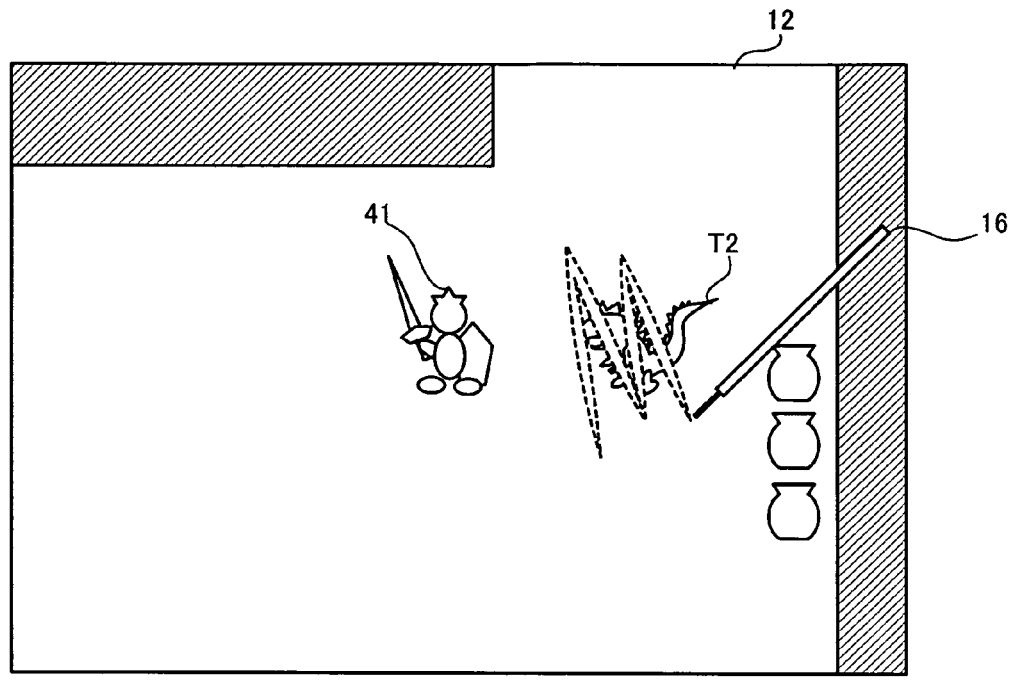
FIG. 11 is a diagram illustrating a game screen when the player performs a scratch operation.

Next, a process when the player's character performs a scratch operation will be described with reference to FIGS. 11 and 12. FIG. 11 is a diagram illustrating a game screen when the player performs a scratch operation. In FIG. 11, a trail T2 is drawn by the player in a region on the right side of the player's character 41. The trail T2 is in the shape of a broken line which is composed of five straight line trails which are successively drawn. As illustrated in FIG. 11, the scratch operation is an operation in which a straight line trail is drawn by a plurality of turns in alternating directions.

After the player draws a trail on the screen, the game apparatus 10 approximates the trail as one or more straight lines. FIG. 12 is a diagram illustrating an exemplary trail drawn by the player. In FIG. 12, it is assumed that the position of a point P5 is an initial input position and the position of a point P13 is an input position which is finally detected. Concerning a broken line obtained by successively linking each detected input position, the game apparatus 10 detects a portion thereof at which two line segments connected to each other attain an acute angle (step S31 described below). Specifically, every time the game apparatus 10 detects a new input position, an angle difference between a current differential vector and a previous differential vector is calculated. Thereafter, based on the angle difference, it is determined whether or not an angle between two line segments connected to each other is acute (step S32 described below).

Figure 12:
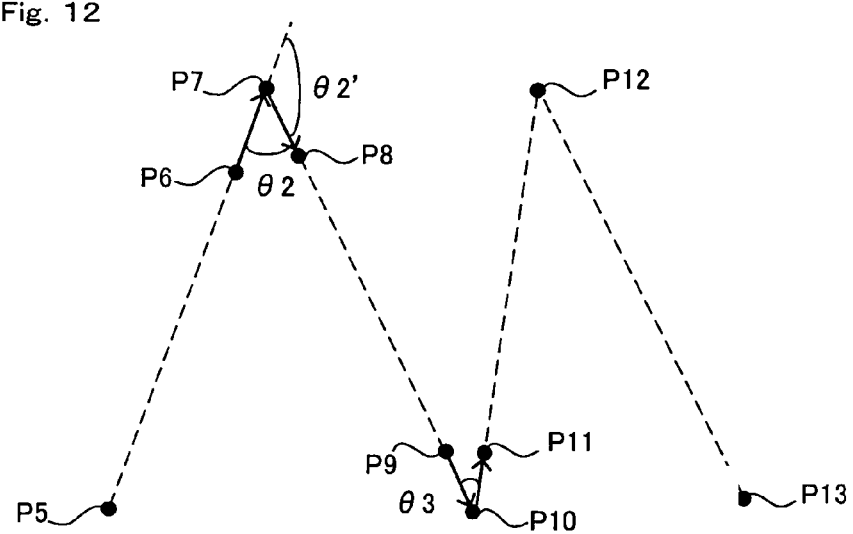
FIG. 12 is a diagram illustrating an exemplary trail drawn by the player.

For example, in the case of the broken line of FIG. 12, a line segment (differential vector) connecting from a point P6 to a point P7 and a line segment connecting from the point P7 to a point P8 attain an acute angle $\theta 2$. The angle $\theta 2$ between the line segment (differential vector) connecting from the point P6 to the point P7 and the line segment connecting from the point P7 to the point P8 is acute when an angle difference $\theta 2'$ between a differential vector connecting from the point P6 to the point P7 and a differential vector connecting from the point P7 to the point P8 is in the range of $90°<\theta 2'<270°$. Note that an input position which is located at the vertex of an acute portion of the broken line is hereinafter referred to as a reverse position.

When two or more reverse positions are detected on a trail drawn by the player, the game apparatus 10 determines whether or not the second one of two successively detected reverse positions was input within a predetermined time after the first one was detected (step S42 described below). Note that the predetermined time is previously determined. As a result of the determination, when the input was performed within the predetermined time, a vector connecting the two reverse positions is calculated as a trail vector. For example, in the case of FIG. 12, when the input position (reverse position) of a point P10 was input within the predetermined time after the input position (reverse position) of the point P7 was detected, a vector connecting from the point P7 to the point P10 is calculated as a trail vector. Similarly, when the input position of a point P12 was input within the predetermined time after detection of the input position of the point P10, a vector connecting from the point P10 to the point P12 is calculated as a trail vector.

As described above, in order to determine that an operation of drawing a trail is a scratch operation, the following two conditions need to be satisfied. The first condition is that two or more reverse positions are present on a trail drawn by the player. The second condition is that a second reverse position is input within the predetermined time after a first reverse position is input.

Here, the reason why the first condition requires two or more reverse positions is that a scratch operation is distinguished from a moving operation. If the trail drawing operation is determined to be a scratch operation when only one reverse position is present, a moving operation of causing the player's character to change directions may be determined to be a scratch operation. This is because, when a moving operation of causing the player's character to change directions is performed, a trail drawn by the player contains a reverse position. To prevent this, in this embodiment, the first condition requires two or more reverse positions.

Similar to the first condition, the second condition is provided in order to distinguish a scratch operation from a moving operation. The player may perform a moving operation in the following way. The player's character is caused to change directions, and after a while, change directions again. By setting the second condition, an operation in such a case is prevented from being determined as a scratch operation.

Continuous attacks are started during a period of time when the player continues to perform an input to the touch panel 15. Specifically, at a time when the first and second conditions are satisfied, the game apparatus 10 causes the player's character to make an attack action even while the player continues to perform an input to the touch panel 15. Thereafter, the player further continues to perform a touch input, and then when the first and second conditions are satisfied again, the player's character is caused to perform an attack action again. Therefore, the player can cause the player's character to make continuous attacks by performing continuous scratch operations (while continuing a touch input).

Note that, in this embodiment, an action during continuous attacks is determined, depending on the angle between a trail vector and a reference vector, in a manner similar to that for an action during the normal attacks. In other embodiments, even if the trail vector is the same, an action during continuous attacks may be different from an action during the normal attacks. An action may be changed, depending on the number of continuous attacks. For example, a special action may be performed when a predetermined number or more of continuous attacks have been performed.

Figure 13:
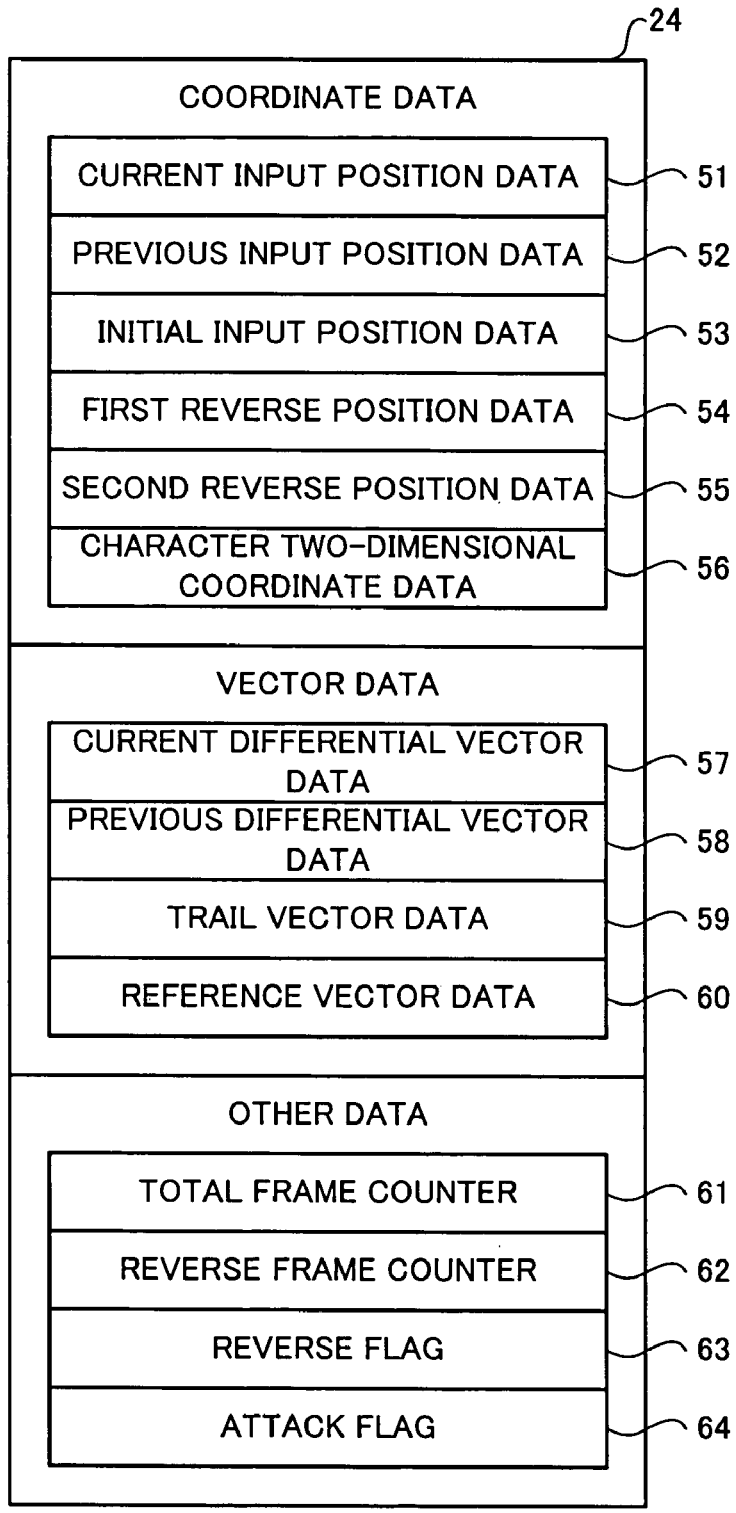
FIG. 13 is a diagram illustrating main data stored in the RAM 24 of the game apparatus 10.

Next, details of a game process which is performed by the game apparatus 10 executing a game program will be described. Firstly, main data which is used in the game process will be described with reference to FIG. 13. FIG. 13 is a diagram illustrating main data stored in a RAM 24 of the game apparatus 10. As illustrated in FIG. 13, the RAM 24 stores coordinate data, such as current input position data 51, previous input position data 52, initial input position data 53, first reverse position data 54, second reverse position data 55, character two-dimensional coordinate data 56, and the like. The RAM 24 also stores vector data, such as current differential vector data 57, previous differential vector data 58, trail vector data 59, reference vector data 60, and the like. The RAM 24 also stores data used for a game process, such as a total frame counter 61, a reverse frame counter 62, a reverse flag 63, an attack flag 64, and the like. Note that, in addition to the data of FIG. 13, the RAM 24 also stores data concerning the player's character (image data, position data, and the like of the player's character), data concerning the game space (geographic data, etc.), and the like.

The current input position data 51 is data indicating the coordinates of a current input position. The current input position data 51 indicates a latest input position, and is updated every time the touch panel 15 detects an input position, i.e., the game apparatus 10 reads coordinate data output from the touch panel 15. The previous input position data 52 is data indicating the coordinates of a previous input position. The previous input position data 52 is updated every time the current input position data 51 is updated, and coordinates indicated by the current input position data 51 before updating is stored as the previous input position data 52 after updating. The initial input position data 53 is data indicating the coordinates of an initial input position.

The reverse position data 54 and 55 are data indicating the coordinates of reverse positions. The first reverse position data 54 indicates the coordinates of a latest reverse position, and the second reverse position data 55 indicates the coordinates of a previous reverse position. For example, the case where the trail of FIG. 12 is drawn will be described. When the position of a point P11 is a current input position, the first reverse position data 54 indicates the coordinates of the reverse position of the point P10, and the second reverse position data 55 indicates the coordinates of the reverse position of the point P7.

The character two-dimensional coordinate data 56 is data indicating a position (coordinates) of the player's character on the screen. Note that, in addition to the character two-dimensional coordinate data 56, data indicating the three-dimensional coordinates of the player's character in the game space is stored in the RAM 24, though not illustrated in FIG. 13.

The current differential vector data 57 is data indicating a current differential vector. The current differential vector data 57 indicates a latest differential vector, and is updated every time the touch panel 15 detects an input position. The previous differential vector data 58 is data indicating a previous differential vector. The previous differential vector data 58 is updated every time the current differential vector data 57 is updated. Coordinates indicated by the current differential vector data 57 before updating is stored as the previous differential vector data 58 after updating. The trail vector data 59 is data indicating a trail vector. The reference vector data 60 is data indicating a reference vector.

The total frame counter 61 is a counter indicating the number of frames since the start of a touch input by the player. The reverse frame counter 62 is a counter indicating the number of frames since a trail drawn by the player is reversed. Referring to FIG. 12, when the input position of the point P8 has been detected, the game apparatus 10 determines that a trail drawn by the player has been reversed, and starts measurement using the reverse frame counter 62. When the trail is reversed again (detection of the input position of the point P11 in FIG. 12), the game apparatus 10 resets the value of the reverse frame counter 62 and performs measurement again from the beginning.

The reverse flag 63 is a flag indicating whether or not a trail has been reversed. Specifically, when a trail has been reversed, the reverse flag 63 is set to be "ON". When a trail has not been reversed, the reverse flag 63 is set to be "OFF". Referring to FIG. 12, when the input position of the point P8 has been detected, the game apparatus 10 determines that a trail drawn by the player has been reversed, and sets the reverse flag 63 to be "ON". Note that the reverse flag 63 is initially set to be "OFF". The attack flag 64 is a flag indicating whether or not the player's character is performing an attack action. In other words, when the player's character starts an attack action, the attack flag 64 is set to be "ON". When the action is ended, the attack flag 64 is set to be "OFF".

Figure 14:
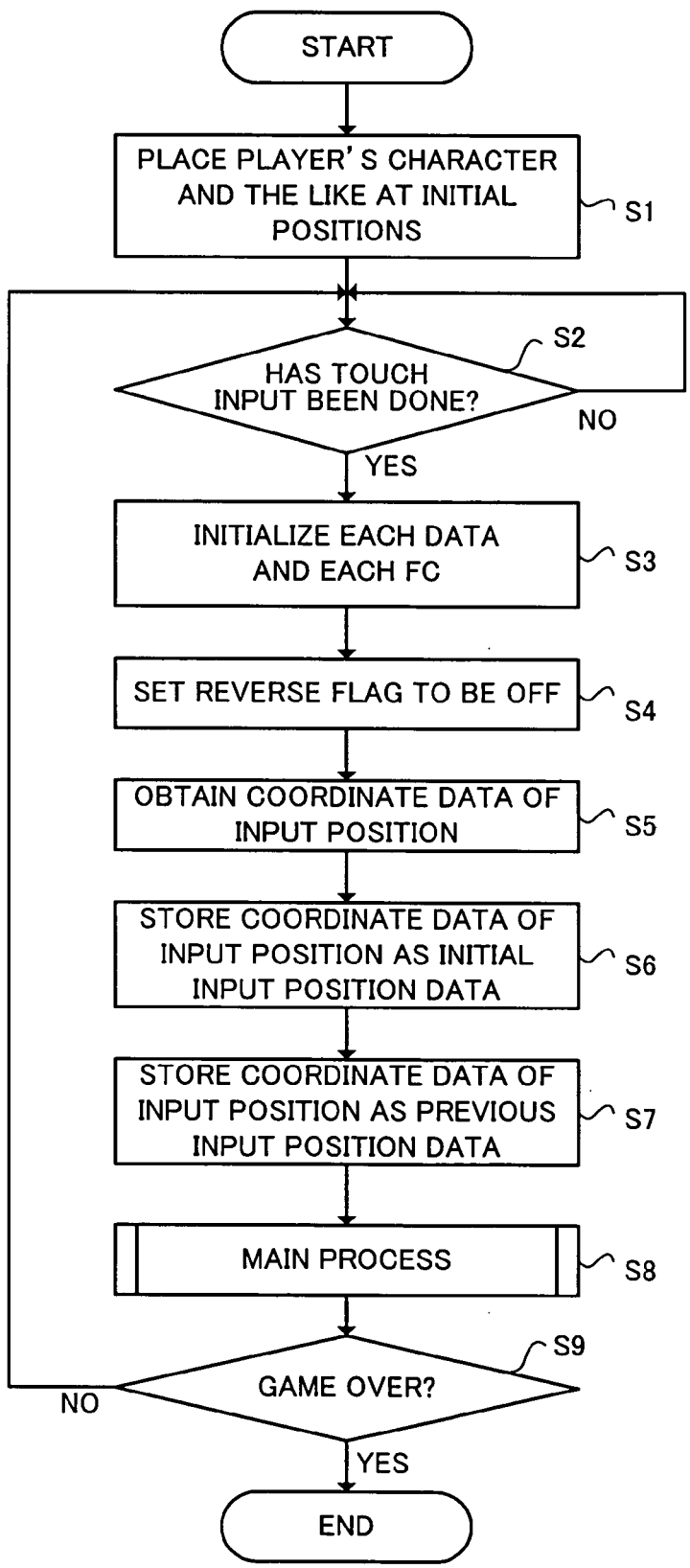
FIG. 14 is a flowchart illustrating a flow of a game process performed in the game apparatus 10.

Next, details of a game process which is performed by the game apparatus 10 executing a game program will be described with reference to FIGS. 14 to 19. FIG. 14 is a flowchart illustrating a flow of the game process performed by the game apparatus 10. When the game apparatus 10 is powered ON, the CPU core 21 of the game apparatus 10 executes a boot program stored in a boot ROM (not illustrated), and initializes each unit, such as the RAM 24 and the like. Thereafter, a game program stored in the memory card 17 is read into the RAM 24, and the CPU core 21 staffs to execute the game program. The flowchart of FIG. 14 illustrates a game process which is performed after completion of the above-described process. Note that, in FIGS. 14 to 19, processes of the game process which concern a moving operation and an attack operation with respect to the player's character will be described in detail, and other processes which are not related to the exemplary embodiment presented herein will not be described.

In step S1 of FIG. 14, initially, the game space is constructed, and the player's character and the enemy character are placed at their initial positions. Also, a virtual camera is provided at a position at which the virtual camera captures an image of the player's character and its surrounding game space, and the game space image viewed from the virtual camera is displayed on the second LCD. In processes after step S1, a game operation using the touch panel or the like is received, so that a game proceeds. Following step S1, a process of step S2 is performed.

In step S2, it is determined whether or not a touch input has been performed. Specifically, the CPU core 21 reads data output from the touch panel 15, and determines whether or not coordinate data has been output from the touch panel 15. When coordinate data has been output from the touch panel 15, it is determined that a touch input has been performed, and a process of step S3 is performed. On the other hand, when data indicating the absence of an input has been output from the touch panel 15, it is determined that a touch input has not been performed, and the process of step S2 is performed again. In other words, the CPU core 21 repeatedly performs the process of step S2 until a touch input is input, and when a touch input has been performed, the process of step S3 is performed.

In step S3, each data and each frame counter are initialized. Specifically, each data stored in the RAM 24 (the coordinate data 51 to 56 and the vector data 57 to 60) and the values of the frame counters 61 and 62 are initialized. In the following step S4, the value of the reverse flag 63 stored in the RAM 24 is set to be "OFF". Following step S4, a process of step S5 is performed.

In step S5, an input position is detected on the touch panel 15. Specifically, the CPU core 21 obtains coordinate data of the input position from the touch panel 15, and stores the obtained coordinate data as the current input position data 51 into the RAM 24. In the following step S6, the input position detected in step S5 is set to be an initial input position. Specifically, the CPU core 21 stores the coordinate data obtained in step S5, as the initial input position data 53, into the RAM 24. In the following step S7, the CPU core 21 stores the coordinate data obtained in step S5, as the previous input position data 52, into the RAM 24. The process of step S7 is a process which stores the previous input position data 52 which is required when a current differential vector is calculated in step S13 described below. Following step S7, a process of step S8 is performed.

In step S8, a main process is performed. In the main process, input position(s) are detected on the touch panel 15, and based on the detected input position, the player's character is caused to move or perform an attack action. Hereinafter, details of the main process will be described with reference to FIGS. 15 to 19.

Figure 15:
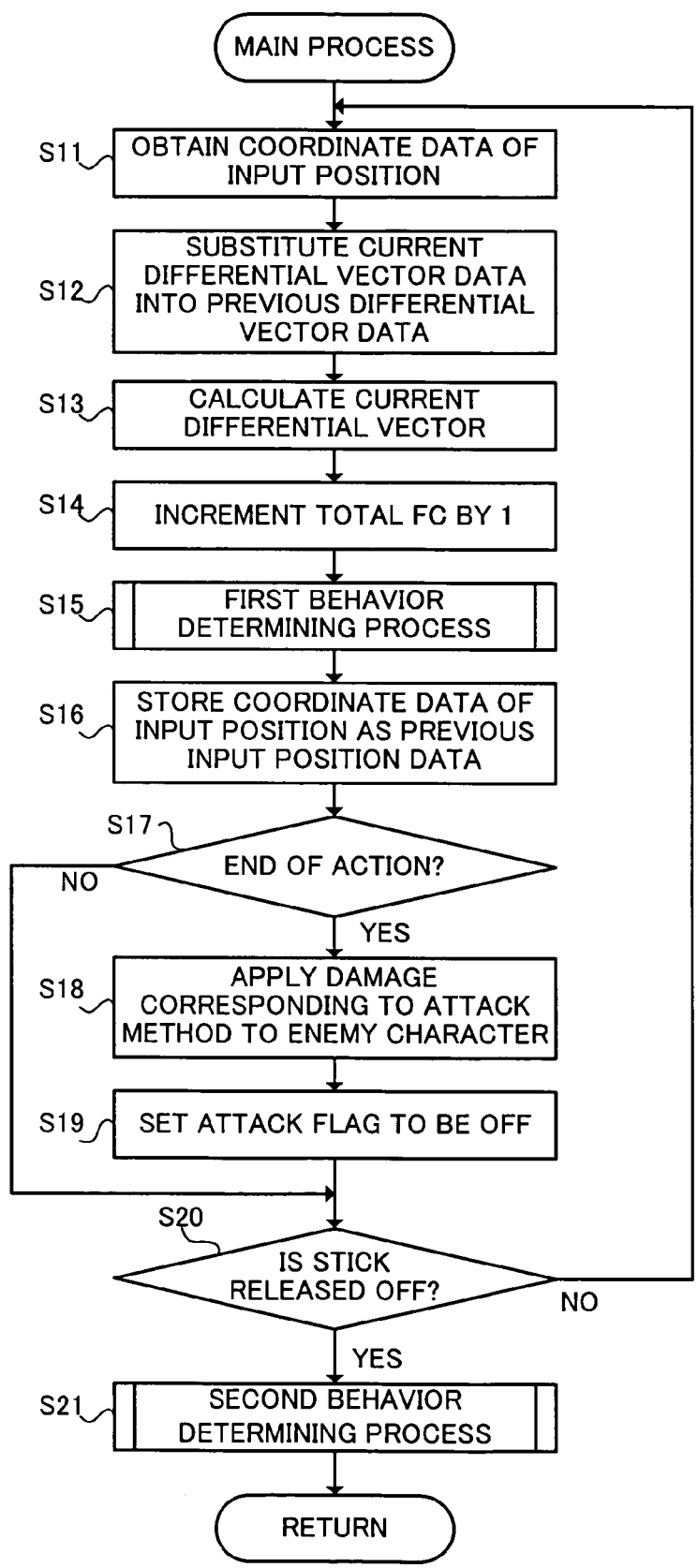
FIG. 15 is a flowchart illustrating a detailed flow of a process of step S8 of FIG. 14.

FIG. 15 is a flowchart illustrating a flow of a detailed process of step S8 of FIG. 14. In the main process, initially, an input position is detected on the touch panel 15 in step S11. A process of step S11 is similar to that of step S5. Note that, in step S11, the current input position data 51 is updated and stored into the RAM 24. Also in the main process, the process of step S11 is performed for each frame. Following step S11, a process of step S12 is performed.

In step S12, the current differential vector data 57 stored in the RAM 24 is substituted into the previous differential vector data 58. In other words, the contents of the current differential vector data 57 stored in the RAM 24 are stored as the previous differential vector data 58. In the following step S13, a current differential vector is newly calculated. As described above, the current differential vector is a vector whose starting point is a previous input position and whose ending point is a current input position (see FIG. 6). The current differential vector is calculated using the current input position data 51 and the previous input position data 52 stored in the RAM 24. In the following step S14, the value of the total frame counter 61 stored in the RAM 24 is incremented by 1.

In step S15 following step S14, a first behavior determining process is performed. The first behavior determining process is a process in which, based on a touch input performed by the player, it is determined whether or not an operation performed by the player is a moving operation or an attack operation (scratch operation), and the player's character is operated in accordance with the player's operation. Hereinafter, details of the first behavior determining process will be described with reference to FIGS. 16 to 18.

Figure 16:
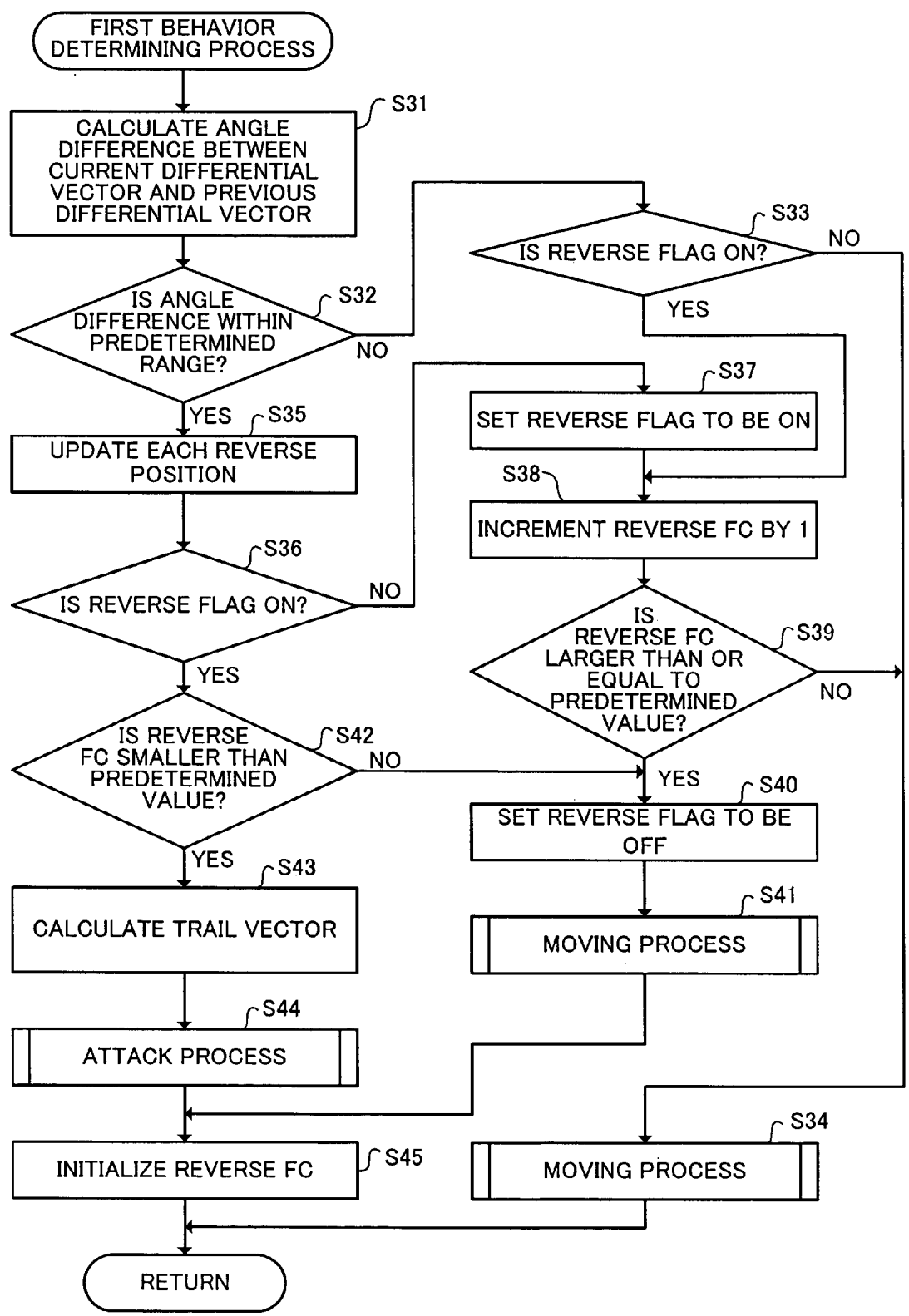
FIG. 16 is a flowchart illustrating a detailed flow of a process of step S15 of FIG. 15.

FIG. 16 is a flowchart illustrating a detailed process flow of step S15 of FIG. 15. In the first behavior determining process, initially, an angle difference between a current differential vector and a previous differential vector is calculated in step S31. The angle difference is calculated using the current differential vector data 57 and the previous differential vector data 58 stored in the RAM 24. In the following step S32, it is determined whether or not the angle difference calculated in step S31 has a value in a predetermined range. The predetermined range is a range within which the angle difference θ between the current differential vector and the previous differential vector falls within 90°<θ<270°. When the angle difference θ is 90°<θ<270°, a broken line connecting input positions in order of detection (a trail drawn by the player) has a portion having an acute angle. For example, assuming that the trail of FIG. 12 is drawn, when the position of the point P8 or P11 is a current input position, it is determined in step S32 that the angle difference has a value within the predetermined range. The process of step S32 is a process which determines whether or not a broken line connecting input positions in order of detection, which indicates a trail drawn by the player, has a portion having an acute angle, i.e., whether or not the direction of the trail drawn by the player is reversed.

When it is determined in step S32 that the angle difference has a value within the predetermined range, a process of step S35 is performed. In processes after step S35, if predetermined conditions are satisfied, it is determined that the player's operation is a scratch operation, and an attack process of the player's character is performed (step S44 described below). Note that, unless the predetermined conditions are satisfied, it is determined that the player's operation is a moving operation, and a moving process of the player's character is performed (step S34 or S41 described below). On the other hand, when it is determined in step S32 that the angle difference does not have a value within the predetermined range, a process of step S33 is performed. In processes after step S33, the moving process of the player's character is performed (step S34 or S41 described below).

In step S33, it is determined whether or not the reverse flag 63 stored in the RAM 24 is "ON". The process of step S33 is a process for determining whether or not a trail which is currently input has a reverse position. For example, in the case where the trail of FIG. 12 is drawn, the reverse flag 63 is set to be "ON" at a time when the position of the point P8 is a current input position (step S37 described below). Therefore, if a position after the point P8 is a current input position, it is determined in step S33 that the reverse flag 63 is "ON". When it is determined in step S33 that the reverse flag 63 is "ON", a process of step S38 described below is performed. On the other hand, when it is determined that the reverse flag 63 is not "ON" (i.e., is "OFF"), the process of step S34 is performed.

In step S34, a moving process is performed. The moving process is a process which causes the player's character to move within the game space. Hereinafter, details of the moving process will be described with reference to FIG. 17.

Figure 17:
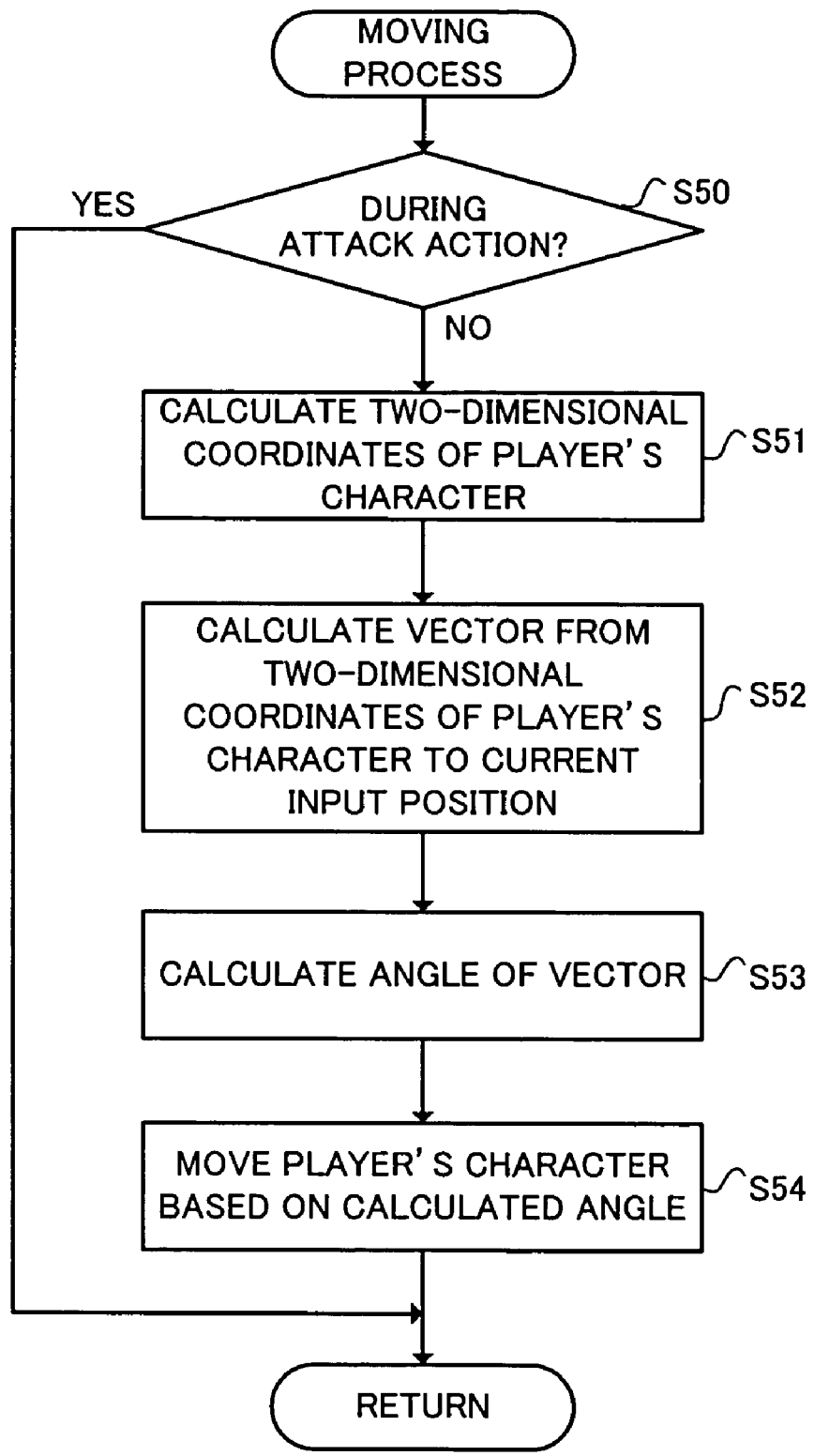
FIG. 17 is a flowchart illustrating a detailed flow of step S34 of FIG. 16.

FIG. 17 is a flowchart illustrating a detailed flow of the process of step S34 of FIG. 16. In the moving process, initially, it is determined whether or not the player's character is performing an attack action in step S50. Specifically, when the attack flag 64 stored in the RAM 24 is "ON", it is determined that the player's character is performing an attack action. In this case, processes of steps S51 to S54 are skipped, and the CPU core 21 ends the moving process. Therefore, in this embodiment, a process of causing the player's character to move (steps S51 to S54) is performed under a condition that the player's character is not performing an attack action. On the other hand, when the attack flag 64 stored in the RAM 24 is "OFF", it is determined that the player's character is not performing an attack action. In this case, the process of step S51 is performed.

In step S51, two-dimensional coordinates indicating the position of the player's character on the screen are calculated. Specifically, the CPU core 21 transforms three-dimensional coordinates indicating the position of the player's character in the game space into two-dimensional coordinates on a projection surface of the virtual camera, and from the two-dimensional coordinates, calculates two-dimensional coordinates in the coordinate system on the touch panel 15. The coordinate data thus calculated is stored as the character two-dimensional coordinate data 56 into the RAM 24. Following step S51, a process of step S52 is performed.

In step S52, a vector whose starting point is located at the two-dimensional coordinates of the player's character calculated in step S51 and whose ending point is a current input position, is calculated. This vector is calculated using the current input position data 51 and the character two-dimensional coordinate data 56 stored in the RAM 24. In the following step S53, an angle of the vector calculated in step S52 is calculated. Specifically, assuming that a predetermined reference direction is oriented at 0°, the angle of the vector is calculated. In the following step S54, the player's character is moved in the game space based on the angle calculated in step S53 (see FIG. 3). Specifically, the CPU core 21 determines a movement direction of the player's character based on the angle calculated in step S53. The player's character is moved by a predetermined distance in the movement direction thus determined. Note that the predetermined distance is a distance by which the player's character can be moved between one frame and the next. The predetermined distance may be a constant value or may be determined, depending on the magnitude of the vector calculated in step S52. After the above-described processes of steps S51 to S54 are ended, the CPU core 21 ends the moving process.

Referring back to FIG. 16, after the process of step S34 is ended, the CPU core 21 ends the first behavior determining process. As described above, when a trail drawn by the player has no reverse position (the result of the determination in step S32 is negative), an operation of moving the player's character in the game space is performed.

On the other hand, when a trail drawn by the player has a reverse position (the result of the determination in step S32 is positive) as described above, the process of step S35 is performed. In step S35, the reverse position data 54 and 55 stored in the RAM 24 are each updated. Specifically, the contents of the first reverse position data 54 stored in the RAM 24 are stored as the second reverse position data 55, and the contents of the previous input position data 52 are stored as new first reverse position data 54. Following step S35, a process of step S36 is performed.

In step S36, it is determined whether or not the reverse flag 63 stored in the RAM 24 is "ON". The process of step S36 is the same as that of step S33. In step S36, when it is determined that the reverse flag 63 is "ON", a process of step S42 described below is performed. On the other hand, when it is determined that the reverse flag 63 is not "ON" (i.e., is "OFF"), the process of step S37 is performed. For example, the case where the trail of FIG. 12 is drawn will be described. When the position of the point P11 is a current input position, the result of the determination in step S32 is positive and the result of the determination in step S36 is positive. Therefore, in this case, the flow goes to the process of step S42. When the position of the point P8 is a current input position, the result of the determination in step S32 is positive and the result of the determination in step S36 is negative. Therefore, in this case, the flow goes to the process of step S37.

In step S37, the reverse flag 63 stored in the RAM 24 is set to be "ON". In the following step S38, the value of the reverse frame counter 62 stored in the RAM 24 is incremented by 1. In the following step S39, it is determined whether or not the value of the reverse frame counter 62 is larger than or equal to a predetermined value. A process of step S39 determines whether or not the second condition for a scratch operation is satisfied. When it is determined that the value of the reverse frame counter 62 is larger than or equal to the predetermined value, a process of step S40 is performed. On the other hand, when the value of the reverse frame counter 62 is smaller than the predetermined value, the above-described moving process of step S34 is performed.

In step S40, the reverse flag 63 stored in the RAM 24 is set to be "OFF". This is because, when the process of step S40 is performed, the second condition for a scratch operation is not satisfied. In the following step S41, a moving process is performed. Therefore, when the second condition for a scratch operation is not satisfied, it is determined that the player's operation is a moving operation. Note that the process of step S41 is the same as the above-described moving process of step S34. Following step S41, a process of step S45 described below is performed.

On the other hand, in step S42, it is determined whether or not the value of the reverse frame counter 62 is larger than or equal to a predetermined value. A process of step S42 is the same as the above-described process of step S39. When it is determined that the value of the reverse frame counter 62 is larger than or equal to the predetermined value, the above-described process of step S40 is performed. On the other hand, when the value of the reverse frame counter 62 is smaller than the predetermined value, a process of step S43 is performed.

In step S43, a trail vector is calculated. The trail vector is a vector whose starting point is the second reverse position and whose ending point is the first reverse position. Therefore, the trail vector can be calculated using the reverse position data 54 and 55 stored in the RAM 24. Following step S43, a process of step S44 is performed.

In step S44, an attacking process is performed. The attacking process is a process which causes the player's character to perform an attack action in the game space. Hereinafter, details of the attacking process will be described with reference to FIG. 18.

Figure 18:
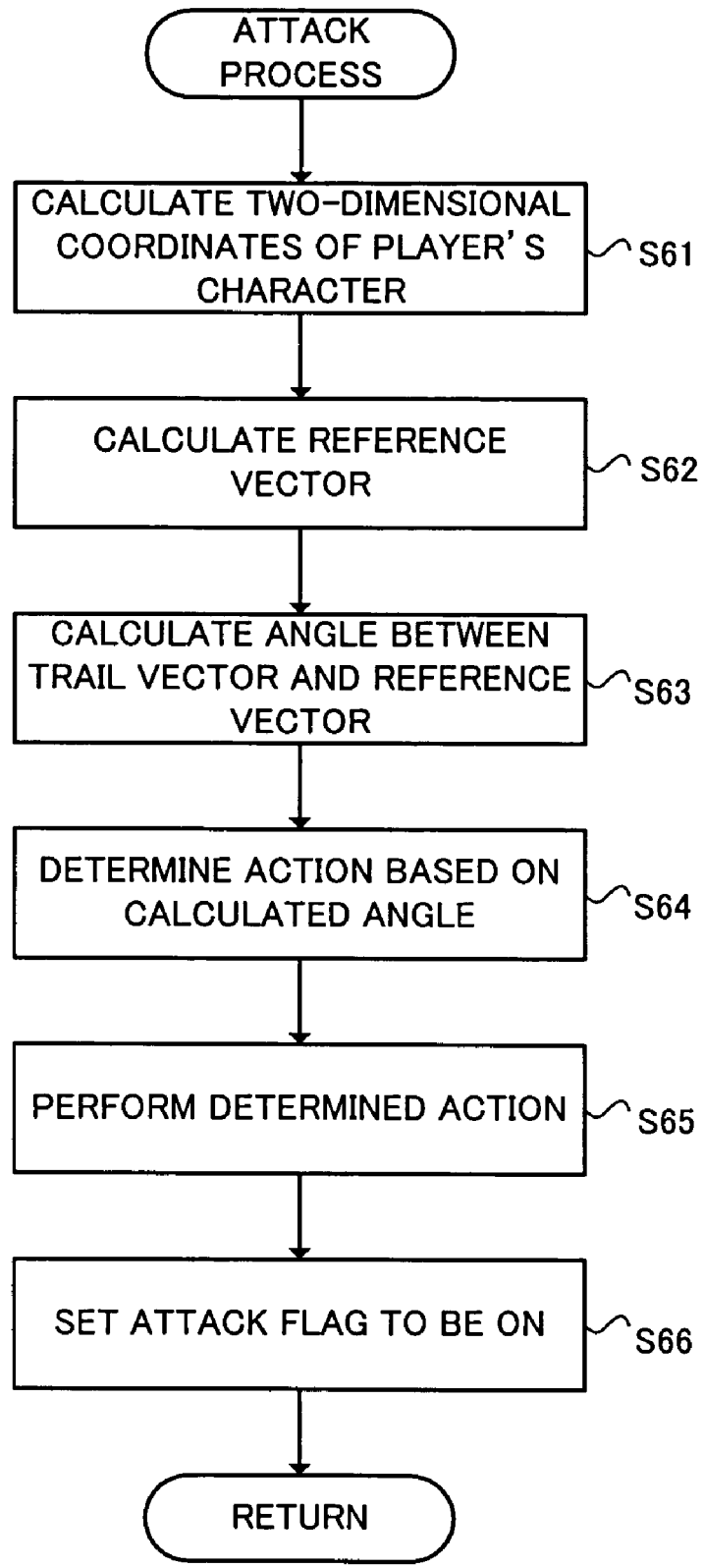
FIG. 18 is a flowchart illustrating a detailed flow of step S44 of FIG. 16.

FIG. 18 is a flowchart illustrating a detailed flow of the process of step S44 of FIG. 16. In the attacking process, initially, two-dimensional coordinates indicating the position of the player's character on the screen are calculated in step S61. A process of step S61 is the same as the above-described process of step S51 of FIG. 17. In the following step S62, a reference vector is calculated. As described above, the reference vector is a vector whose starting point is located at the two-dimensional coordinates of the player's character calculated in step S51 and whose ending point is a current input position. Therefore, the reference vector is calculated using the current input position data 51 and the character two-dimensional coordinate data 56 stored in the RAM 24. The reference vector thus calculated is stored as the reference vector data 60 into the RAM 24. Following step S62, a process of step S63 is performed.

In step S63, an angle between the trail vector and the reference vector is calculated. The angle is calculated using the trail vector data 59 and the reference vector data 60 stored in the RAM 24. In the following step S64, based on the angle calculated in step S63, an action which is to be performed by the player's character is determined. Specifically, the action which is to be performed by the player's character is determined, depending on which of the first to fourth ranges (see FIG. 8) the angle calculated in step S63 belongs to.

In the following step S65, the CPU core 21 causes the player's character to perform the action determined in step S64. Specifically, a game image in which the player's character performs the action is displayed on the second LCD. Note that an animation of the action performed by the player's character is displayed over a plurality of frames. Here, at the time of step S65, when the previously started attack action is not ended (i.e., the attack flag 64 is "ON"), the CPU core 21 may cause the player's character to perform the action determined in the previous step S64, following the end of the previously started attack action. Thereby, when the player performs a further attack operation during an attack action of the player's character, another attack action is performed without interruption.

In the following step S66, the value of the attack flag 64 stored in the RAM 24 is set to be "ON". After step S66, the CPU core 21 ends the attacking process.

Referring back to FIG. 16, the process of step S45 is performed, following the attacking process of step S44. Specifically, in step S45, the value of the reverse frame counter 62 stored in the RAM 24 is initialized (i.e., is set to be 0). After step S45, the CPU core 21 ends the first behavior determining process. The first behavior determining process has been heretofore described.

Referring back to FIG. 15, a process of step S16 is performed, following the first behavior determining process of step S15. Specifically, in step S16, the CPU core 21 stores the contents of the current input position data 51 stored in the RAM 24 as the previous input position data 52 into the RAM 24. A process of step S16 is the same as the above-described process of step S7. Following step S16, a process of step S17 is performed.

In step S17, it is determined whether or not the attack action of the player's character has been ended. Specifically, it is determined whether or not the animation of the attack action started in the attacking process of step S65 has been ended. When the last frame of the animation is displayed on the screen, it is determined that the attack action of the player's character is ended, and processes of steps S18 and S19 are performed. On the other hand, when the animation is not yet ended or when the animation is not displayed, the processes of steps S18 and S19 are skipped and a process of step S20 is performed.

In step S18, the CPU core 21 performs a process of calculating damage on the enemy character. Specifically, damage corresponding to the action performed in step S65 is applied to the enemy character. Specifically, initially, the CPU core 21 determines whether or not the attack action performed in step S65 hit the enemy character. When the attack did not hit the enemy character, the process of step S18 is ended. Here, the RAM 24 stores a table in which actions of the player's character are associated with levels of damage by the actions with respect to the enemy character. When the attack hit the enemy character, the CPU core 21 applies damage corresponding to the action performed in step S65 to the enemy character with reference to the table. Specifically, a parameter indicating the physical strength of the enemy character is reduced, depending on the damage level. After step S18, the process of step S19 is performed. In step S19, the attack flag 64 stored in the RAM 24 is set to be "OFF". After step S19, the process of step S20 is performed.

In step S20, it is determined whether or not the player releases the stick 16 off the touch panel 15, i.e., a touch input is no longer present. The determination of step S20 is performed in a manner similar to that of step S3. Specifically, the CPU core 21 reads data output from the touch panel 15, and determines whether or not coordinate data is output from the touch panel 15. When coordinate data is output from the touch panel 15, it is determined that a touch input is present, and the process of step S11 is performed. Thereafter, the processes of steps S11 to S20 are repeatedly performed until it is determined that a touch input is not present. Note that, in step S11 following step S20, coordinate data read in step S20 is stored as the current input position data 51 into the RAM 24. On the other hand, in the determination of step S20, when data indicating the absence of an input is output from the touch panel 15, it is determined that a touch input is no longer present, and a process of step S21 is performed.

In step S21, a second behavior determining process is performed. The second behavior determining process is a process in which it is determined whether or not the player's operation detected in the immediately previous loop of steps S11 to S20 is the attack operation of a normal attack, and when the player's operation is the attack operation of a normal attack, the player's character is caused to make the normal attack. Hereinafter, details of the second behavior determining process will be described with reference to FIG. 19.

Figure 19:
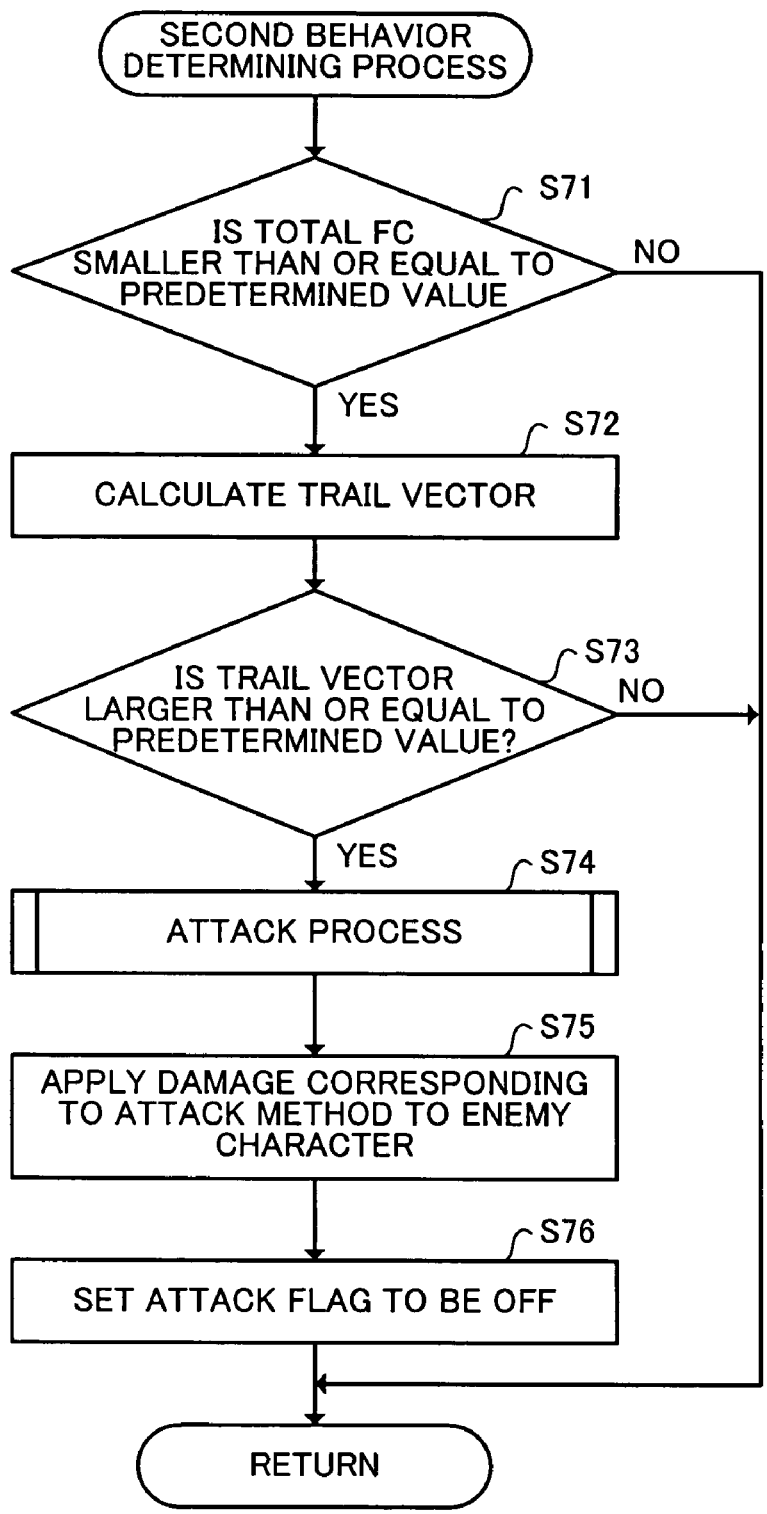
FIG. 19 is a flowchart illustrating a detailed flow of step S21 of FIG. 15.

FIG. 19 is a flowchart illustrating a detailed flow of the process of step S21 of FIG. 15. In the second behavior determining process, initially, it is determined whether or not the value of the total frame counter 61 stored in the RAM 24 is smaller than or equal to a predetermined value in step S71. When the value of the total frame counter 61 is smaller than or equal to the predetermined value, a process of step S72 is performed. On the other hand, when the value of the total frame counter 61 is larger than the predetermined value, the CPU core 21 ends the second behavior determining process. The process of step S71 is a process for determining whether or not a trail drawn by the player in the immediately previous steps S11 to S20 has been input within a predetermined time.

In step S72, a trail vector is calculated. The trail vector is a vector connecting from the staring point to the ending point of the trail drawn by the player in steps S11 to S20. In other words, the trail vector is a vector whose starting point is an initial input position and whose ending point is a last input position. Therefore, the CPU core 21 calculates the trail vector using the initial input position data 53 and the current input position data 51 stored in the RAM 24.

In the following step S73, it is determined whether or not the magnitude of the trail vector calculated in step S72 is larger than or equal to a predetermined value. When the magnitude of the trail vector is larger than or equal to the predetermined value, a process of step S74 is performed. On the other hand, when the magnitude of the trail vector is smaller than the predetermined value, the CPU core 21 ends the second behavior determining process. The process of step S73 is a process for determining whether or not the trail drawn by the player in the immediately previous steps S11 to S20 is longer than or equal to a predetermined length.

In step S74, an attacking process is performed. The attacking process of step S74 is the same as the above-described attacking process of step S34. Note that an action performed by the player's character in the attacking process of the first behavior determining process may be different from that in the attacking process of the second behavior determining process. In the following step S75, the CPU core 21 performs a process of calculating damage on the enemy character. The process of step S75 is the same as the above-described process of step S18. In the following step S76, a process of step S77 similar to that of step S19 is performed. After step S77, the CPU core 21 ends the second behavior determining process of FIG. 15. In FIG. 15, when the second behavior determining process of step S18 is ended, the CPU core 21 ends the main process.

Referring back to FIG. 14, following the main process of step S8, a process of step S9 is performed. Specifically, in step S9, it is determined whether or not the game is to be ended. The determination of step S9 is performed, depending on, for example, whether or not the physical strength of the player's character is zero, whether or not the player's character has killed all enemy character(s), or the like. When it is determined in step S9 that the game is to be ended, the CPU core 21 ends the game process of FIG. 14. On the other hand, when it is determined that the game is not to be ended, the process of step S3 is performed, and thereafter, the processes of steps S3 to S9 are repeatedly performed until it is determined in step S9 that the game is to be ended. The details of the game process have been heretofore described.

Although the control of an operation of the enemy character is not particularly mentioned in the above-described game process, the CPU core 21 performs a process of controlling an operation of the enemy character for each frame. Specifically, the enemy character is caused to move or attack in accordance with a predetermined algorithm. Further, in the game process, it is determined whether or not an attack made by the enemy character hit the player's character, and when the attack hit the player's character, a process of applying damage corresponding to the attach to the player's character is performed.

In the above-described game process, when a distance between an input position and the next detected input position is smaller than a predetermined length, the next detected input position may be ignored. Specifically, when the magnitude of the current differential vector calculated in step S13 is smaller than a predetermined length, the process of step S16 may not be performed. In this case, the current differential vector data is not updated, and the previous differential vector data updated in the immediately previous step S12 is changed back to the contents before the updating. This is because, when such a short differential vector is present, it is likely that a reverse position cannot be correctly selected in the process of calculating an angle difference between a current differential vector and a previous differential vector (step S31).

As described above, according to this embodiment, the player's character performs an attack action varying depending on the angle between a trail vector and a reference vector. Therefore, the player can readily cause the player's character to perform various actions, using the touch panel 15.

Note that, in this embodiment, a touch panel which can specify any arbitrary position on a screen is used as an input device, and a display position of the player's character is regarded as the starting position of a reference vector. Here, in other embodiments, any input device which can specify any arbitrary position on an input surface as with a touch panel may be used. In this case, the starting position of a reference vector is set to be a predetermined position on the input surface of a touch panel (e.g., a center position of the input surface).

As described above, the exemplary embodiment presented herein can be applied to a game program and a game apparatus for the purpose of, for example, causing a player's character to perform various actions in a game employing an input of a pointing device.

While the exemplary embodiment has been described in detail, the foregoing description is in all aspects illustrative and not restrictive. It is understood that numerous other modifications and variations can be devised without departing from the scope of the exemplary embodiment.

What is claimed is:

1. A computer readable recording medium storing a game program which causes a computer of a game apparatus to execute the following, the game apparatus comprising an input device of detecting a position specified by a player on an input surface:
   storing input positions detected by the input device at predetermined time intervals, in order of detection, into a memory of the game apparatus;
   trail vector calculating for calculating a trail vector indicating at least a portion of a trail drawn by the player on the input surface, from the input positions;
   reference vector calculating for calculating a reference vector whose starting point is a predetermined position on the input surface and whose ending point is a position determined by the trail vector;
   action determining for determining an action of a player's character based on an angle between the trail vector and the reference vector; and
   display control for causing a display device to display a state of the player's character performing the determined action.

2. The recording medium according to claim 1, wherein:
   the input surface is provided on a screen of the display device, and the input device is a device of detecting a position specified by the player on the screen;
   the player's character is displayed on the screen; and
   the predetermined position is a position at which the player's character is displayed.

3. The recording medium according to claim 2, wherein, in the display control, the state of the player's character performing the determined action is displayed so that the action is directed from the position at which the player's character is displayed toward a starting point, a middle point, or an ending point of the trail vector.

4. The recording medium according to claim 3, wherein the predetermined position is a center position of the screen.

5. The recording medium according to claim 1, wherein:
   the game program further causes the computer to execute movement determining for determining a movement direction of the player's character based on the input positions detected by the input device; and
   the display control includes causing the display device to display a state of the player's character moving in the movement direction determined by the movement determining.

6. The recording medium according to claim 5, wherein the movement determining is performed every time an input position is detected by the input device under a condition that the action determined by the action determining is not being performed by the player's character.

7. The recording medium according to claim 5, wherein, in the action determining, the action of the player's character is determined only when a magnitude of the trail vector is larger than or equal to a predetermined value.

8. The recording medium according to claim 5, wherein, in the action determining, the action of the player's character is determined only when the portion of the trail indicated by the trail vector is input within a predetermined time.

9. The recording medium according to claim 1, wherein:
   the trail vector calculating includes approximating the trail drawn by the player on the input surface as one or more straight lines, and calculating a vector indicating each straight line as the trail vector;
   in the action determining, an action of the player's character is determined for each trail vector separately; and
   in the display control, a state of the player's character continuously performing the determined actions is displayed on the display device.

10. The recording medium according to claim 9, wherein, in the action determining, when a plurality of trail vectors are calculated in the trail vector calculating, an action different from when a single trail vector is calculated is determined.

11. The recording medium according to claim 1, wherein, in the trail vector calculating, a vector whose starting point is a first detected one of the input positions continuously detected by input device and whose ending point is a finally detected one thereof is calculated as the trail vector.

12. The recording medium according to claim 1, wherein the trail vector calculating includes:
   selecting an input position corresponding to a vertex having an angle between two line segments connected together which is smaller than or equal to a predetermined value, from a broken line connecting the input positions continuously detected by the input device, and calculating a vector connecting two successively detected input positions in order of detection, as a trail vector, when the number of the selected input positions is two or more.

13. The recording medium according to claim 1, wherein, in the reference vector calculating, the reference vector having the ending point of the trail vector as the ending point of the reference vector is calculated.

14. A game apparatus with an input device of detecting a position specified by a player on an input surface, comprising:
storing locations for storing input positions detected by the input device at predetermined time intervals, in order of detection, into a memory of the game apparatus;
trail vector calculating programmed logic circuitry for calculating a trail vector indicating at least a portion of a trail drawn by the player on the input surface, from the input positions;
reference vector calculating programmed logic circuitry for calculating a reference vector whose starting point is a predetermined position on the input surface and whose ending point is a position determined by the trail vector;
action determining programmed logic circuitry for determining an action of a player's character based on an angle between the trail vector and the reference vector; and
display control programmed logic circuitry for causing a display device to display a state of the player's character performing the determined action.

15. A method for controlling an action of a player's character, the method being executed by a game apparatus comprising an input device of detecting a position specified by a player on an input surface, the method comprising:
storing input positions detected by the input device at predetermined time intervals, in order of detection, into a memory of the game apparatus;
calculating a trail vector indicating at least a portion of a trail drawn by the player on the input surface, from the input positions;
calculating a reference vector whose starting point is a predetermined position on the input surface and whose ending point is a position determined by the trail vector;
determining the action of the player's character based on an angle between the trail vector and the reference vector; and
causing a display device to display a state of the player's character performing the determined action.

16. The method according to claim 15, wherein:
the input surface is provided on a screen of the display device, and the input device is a device of detecting a position specified by the player on the screen;
the player's character is displayed on the screen; and
the predetermined position is a position at which the player's character is displayed.

17. The method according to claim 15, further comprising:
determining a movement direction of the player's character based on the input positions detected by the input device,
wherein the display control includes causing the display device to display a state of the player's character moving in the movement direction determined by the movement determining.

18. The method according to claim 17, wherein the movement determining is performed every time an input position is detected by the input device under a condition that the action determined by the action determining is not being performed by the player's character.

19. The method according to claim 15, wherein:
the trail vector calculating includes approximating the trail drawn by the player on the input surface as one or more straight lines, and calculating a vector indicating each straight line as the trail vector;
in the action determining, an action of the player's character is determined for each trail vector separately; and
in the display control, a state of the player's character continuously performing the determined actions is displayed on the display device.

20. The method according to claim 15, wherein, in the reference vector calculating, the reference vector having the ending point of the trail vector as the ending point of the reference vector is calculated.

* * * * *